(12) United States Patent
Amick

(10) Patent No.: US 7,383,776 B2
(45) Date of Patent: *Jun. 10, 2008

(54) SYSTEM AND METHOD FOR PROCESSING FERROTUNGSTEN AND OTHER TUNGSTEN ALLOYS, ARTICLES FORMED THEREFROM AND METHODS FOR DETECTING THE SAME

(76) Inventor: Darryl D. Amick, 3227 Countryman Cir., NW., Albany, OR (US) 97321

( * ) Notice: Subject to any disclaimer, the term of this patent is extended or adjusted under 35 U.S.C. 154(b) by 634 days.

This patent is subject to a terminal disclaimer.

(21) Appl. No.: 10/821,392

(22) Filed: Apr. 9, 2004

(65) Prior Publication Data

US 2005/0034558 A1   Feb. 17, 2005

Related U.S. Application Data

(60) Provisional application No. 60/462,164, filed on Apr. 11, 2003.

(51) Int. Cl.
*F42B 10/00* (2006.01)

(52) U.S. Cl. .......................... 102/439; 75/255; 75/246; 75/248

(58) Field of Classification Search .................. 75/246, 75/248; 419/23, 28; 102/439
See application file for complete search history.

(56) References Cited

U.S. PATENT DOCUMENTS

| 1,847,617 | A | 3/1932 | Löwenstein et al. |
| 2,119,876 | A | 6/1938 | Corson |
| 2,183,359 | A | 12/1939 | Smithells |
| 2,775,536 | A | 12/1956 | Fine |
| 2,919,471 | A | 1/1960 | Hechinger |
| 2,995,090 | A | 8/1961 | Daubenspeck |
| 3,123,003 | A | 3/1964 | Lange, Jr. et al. |

(Continued)

FOREIGN PATENT DOCUMENTS

CA         521944         2/1956

(Continued)

OTHER PUBLICATIONS

"Steel 3-inch Magnum Loads Our Pick For Waterfowl Hunting," *Gun Tests*, Jan. 1998, pp. 25-27.

(Continued)

*Primary Examiner*—Roy King
*Assistant Examiner*—Weiping Zhu
(74) *Attorney, Agent, or Firm*—Dascenzo Intellectual Property Law, P.C.

(57) ABSTRACT

Systems and methods for refining or otherwise processing tungsten alloys, including ferrotungsten powder and articles formed therefrom, and methods for detecting the presence of the same. The methods include at least one of magnetically-separating and particle-size-separating ferrotungsten or ferrotungsten-containing powder. In some embodiments, powder may be separated to remove fine particles, and optionally to separate the remaining particles into fractions containing selected particle size distributions. The powder additionally or alternatively may be separated into at least magnetic and non-magnetic fractions. In some embodiments, portions of two or more size and/or magnetism fractions are mixed to provide a ferrotungsten-containing feedstock. Selected fractions resulting from the size and magnetism separation steps may be utilized to provide a ferrotungsten-containing feedstock from which articles are produced and which may include additional components.

19 Claims, 11 Drawing Sheets

U.S. PATENT DOCUMENTS

| | | |
|---|---|---|
| 3,372,021 A | 3/1968 | Forbes et al. |
| 3,623,849 A | 11/1971 | Benjamin |
| 3,669,656 A | 6/1972 | Murphy et al. |
| 3,785,801 A | 1/1974 | Benjamin |
| 3,888,636 A | 6/1975 | Sczerzenie et al. |
| 3,890,145 A | 6/1975 | Hivert et al. |
| 3,953,194 A | 4/1976 | Hartline, III et al. |
| 3,979,234 A | 9/1976 | Northcutt, Jr. et al. |
| 4,027,594 A | 6/1977 | Olin et al. |
| 4,035,115 A | 7/1977 | Hansen |
| 4,035,116 A | 7/1977 | O'Brien et al. |
| 4,138,249 A | 2/1979 | Rosof |
| 4,274,940 A | 6/1981 | Plancqueel et al. |
| 4,338,126 A | 7/1982 | Vanderpool et al. |
| 4,383,853 A | 5/1983 | Zapffe |
| 4,428,295 A | 1/1984 | Urs |
| 4,488,959 A | 12/1984 | Agar |
| 4,760,794 A | 8/1988 | Allen |
| 4,762,559 A | 8/1988 | Penrice et al. |
| 4,780,981 A | 11/1988 | Hayward et al. |
| 4,784,690 A | 11/1988 | Mullendore |
| 4,881,465 A | 11/1989 | Hooper et al. |
| 4,897,117 A | 1/1990 | Penrice |
| 4,931,252 A | 6/1990 | Brunisholz et al. |
| 4,940,404 A | 7/1990 | Ammon et al. |
| 4,949,644 A | 8/1990 | Brown |
| 4,949,645 A | 8/1990 | Hayward et al. |
| 4,960,563 A | 10/1990 | Nicolas |
| 4,961,383 A | 10/1990 | Fishman et al. |
| 4,990,195 A | 2/1991 | Spencer et al. |
| 5,069,869 A | 12/1991 | Nicolas et al. |
| 5,088,415 A | 2/1992 | Huffman et al. |
| 5,264,022 A | 11/1993 | Haygarth et al. |
| 5,279,787 A | 1/1994 | Oltrogge |
| 5,399,187 A | 3/1995 | Mravic et al. |
| 5,527,376 A | 6/1996 | Amick et al. |
| 5,713,981 A | 2/1998 | Amick |
| 5,719,352 A | 2/1998 | Griffin |
| 5,740,516 A | 4/1998 | Jiranek, II et al. |
| 5,760,331 A | 6/1998 | Lowden et al. |
| 5,786,416 A | 7/1998 | Gardner et al. |
| 5,814,759 A | 9/1998 | Mravic et al. |
| 5,820,707 A | 10/1998 | Amick et al. |
| 5,831,188 A | 11/1998 | Amick et al. |
| 5,847,313 A | 12/1998 | Beal |
| 5,868,879 A | 2/1999 | Amick et al. |
| 5,877,437 A | 3/1999 | Oltrogge |
| 5,894,644 A | 4/1999 | Mravic |
| 5,905,936 A | 5/1999 | Fenwick et al. |
| 5,913,256 A | 6/1999 | Lowden et al. |
| 5,917,143 A | 6/1999 | Stone |
| 5,922,978 A | 7/1999 | Carroll |
| 5,950,064 A | 9/1999 | Robinson et al. |
| 5,963,776 A | 10/1999 | Lowden et al. |
| 6,048,379 A | 4/2000 | Bray et al. |
| 6,090,178 A | 7/2000 | Benini |
| 6,112,669 A | 9/2000 | Mravic et al. |
| 6,136,105 A | 10/2000 | Spencer |
| 6,248,150 B1 | 6/2001 | Amick |
| 6,270,549 B1 | 8/2001 | Amick |
| 6,371,029 B1 | 4/2002 | Beal |
| 6,447,715 B1 | 9/2002 | Amick |
| 6,457,417 B1 | 10/2002 | Beal |
| 6,527,824 B2 | 3/2003 | Amick |
| 6,527,880 B2 | 3/2003 | Amick |
| 6,551,375 B2 | 4/2003 | Siddle et al. |
| 6,551,376 B1 | 4/2003 | Beal |
| 6,581,523 B2 | 6/2003 | Beal |
| 6,591,730 B2 | 7/2003 | Beal |
| 2002/0124759 A1 | 9/2002 | Amick |
| 2002/0152915 A1 | 10/2002 | Vaughn et al. |

FOREIGN PATENT DOCUMENTS

| | | |
|---|---|---|
| GB | 731237 | 6/1955 |
| GB | 2149067 | 6/1985 |
| JP | 52-68800 | 6/1977 |
| JP | 59-6305 | 1/1984 |
| JP | 1-142002 | 6/1989 |
| WO | WO 00/37878 | 6/2000 |

OTHER PUBLICATIONS

Carmichel, Jim, "Heavy Metal Showdown," *Outdoor Life*, Apr. 1997, pp. 73-78.

"Federal's New Tungsten Pellets," *American Hunter*, Jan. 1997, pp. 19, 48-50.

Li, C.-J., et al., "Enhanced Sintering of Tungsten-Phase Equilibria Effects on Properties," The International Journal of Powder Metallurgy & Powder Technology, vol. 20, No. 2, pp. 149-162 (Apr. 1984).

Sykes, W. P., "The Iron-tungsten System," Meeting of the American Institute of Mining and Metallurgical Engineers, New York, pp. 968-1008 (Feb. 1926).

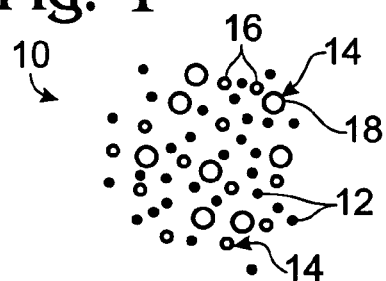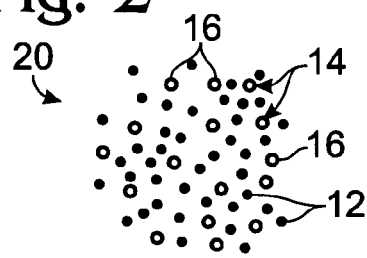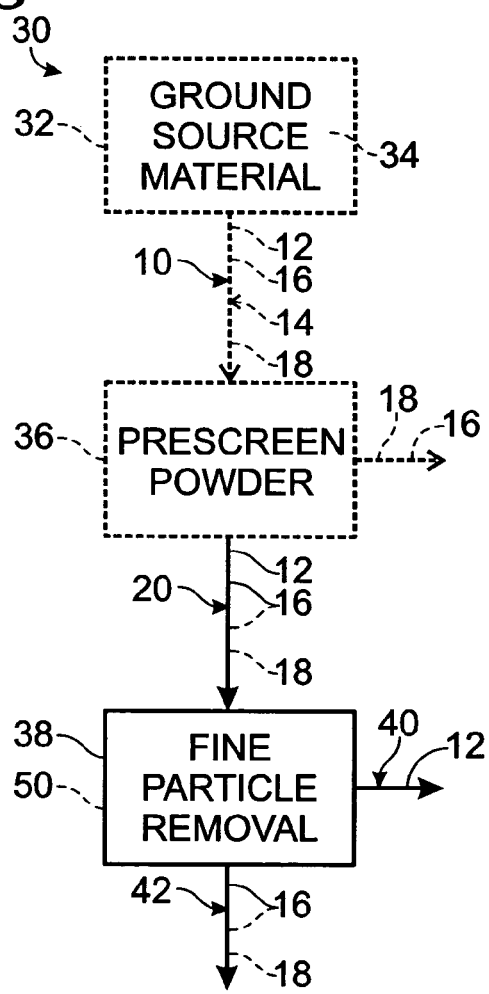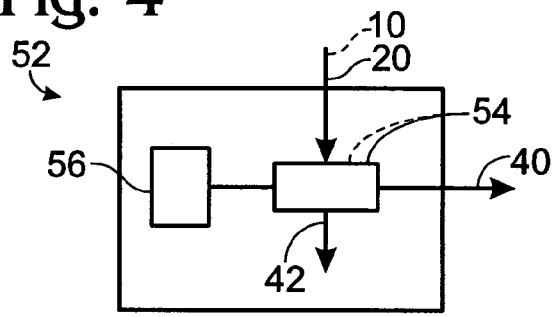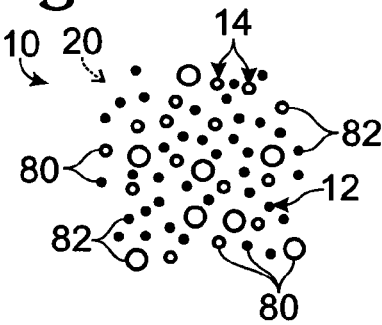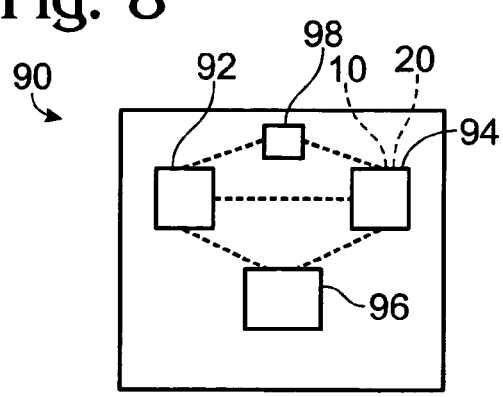

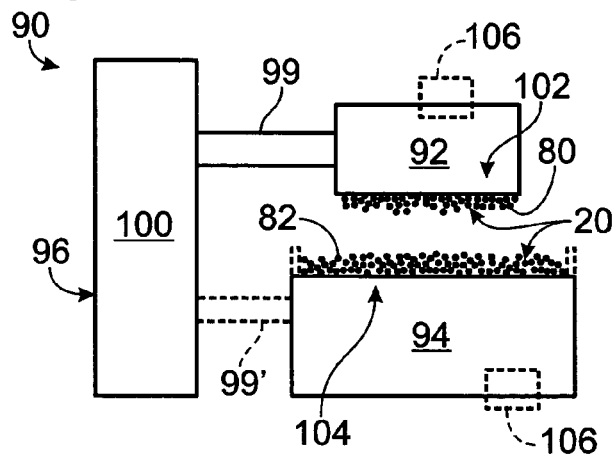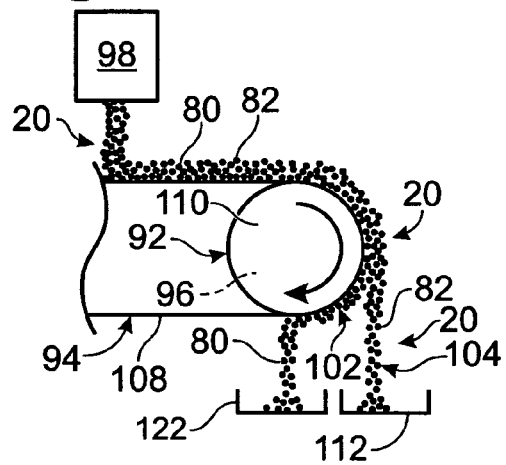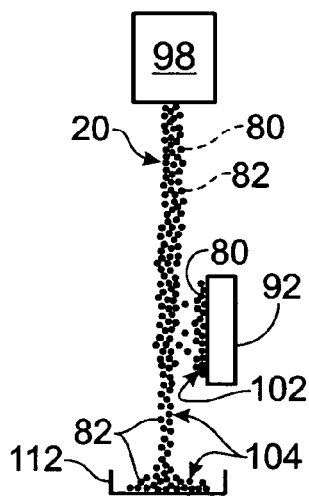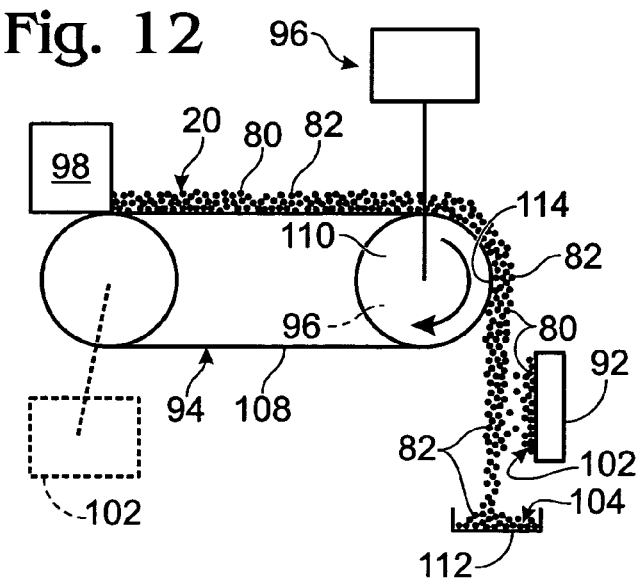

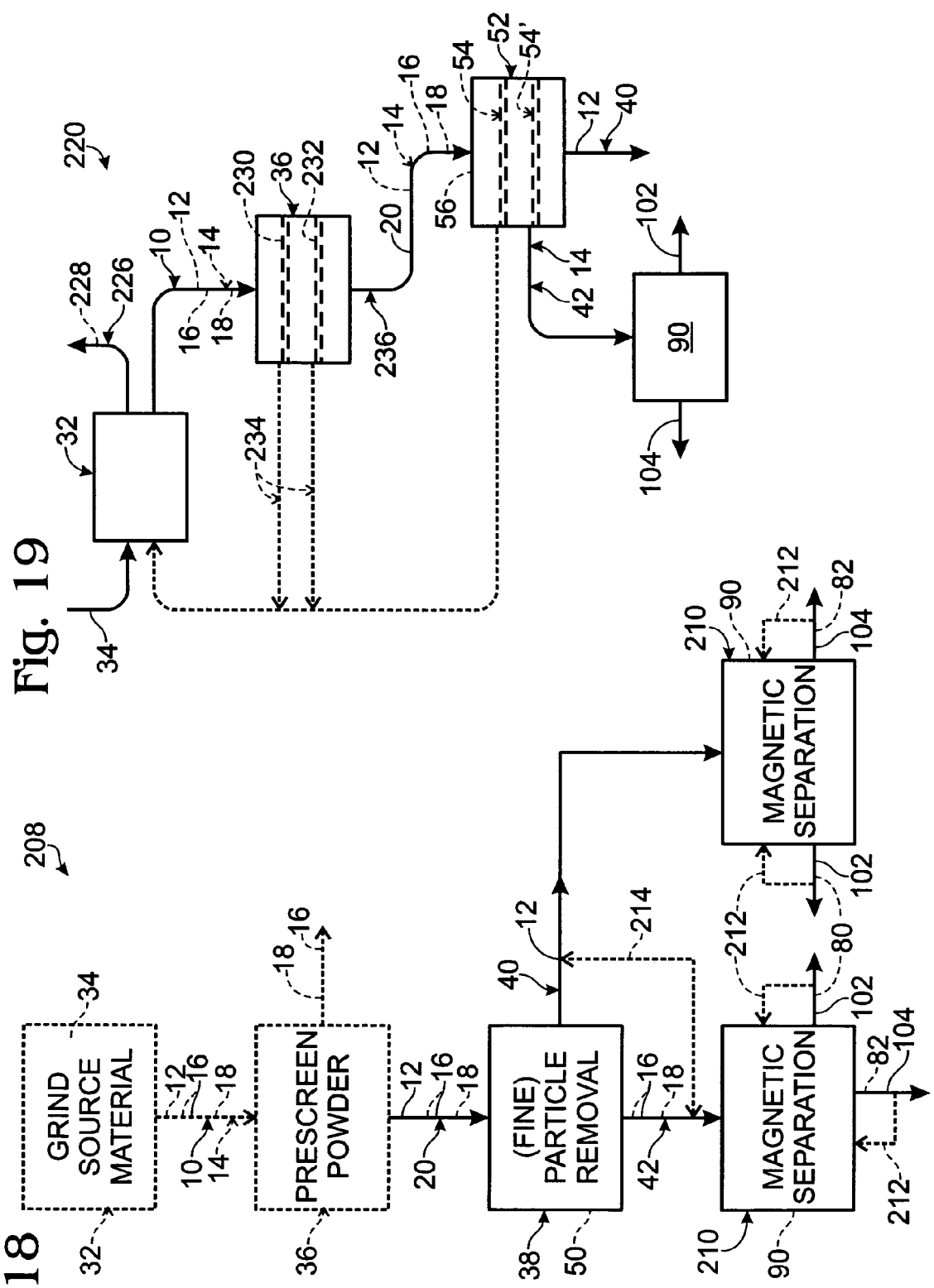

SYSTEM AND METHOD FOR PROCESSING FERROTUNGSTEN AND OTHER TUNGSTEN ALLOYS, ARTICLES FORMED THEREFROM AND METHODS FOR DETECTING THE SAME

RELATED APPLICATION

The present application claims priority to U.S. Provisional Patent Application Ser. No. 60/462,164, which was filed on Apr. 11, 2003, and the complete disclosure of which is hereby incorporated by reference for all purposes.

FIELD OF THE DISCLOSURE

The present disclosure is directed generally to systems, methods and articles incorporating tungsten alloys, and more particularly to systems and methods for processing tungsten alloys, including ferrotungsten, as well as to articles that include the processed tungsten alloys and methods for detecting the use of tungsten alloys according to the present disclosure.

BACKGROUND OF THE DISCLOSURE

Many articles that previously have been formed from lead are now formed from other materials because of health concerns regarding the toxicity of lead. Examples of materials that have proven effective as lead substitutes are materials that are formed from tungsten and/or tungsten alloys. One significant factor why tungsten and its alloys are effective for use as lead substitutes is that tungsten is very dense. More specifically, tungsten has a density of 19.3 g/cc, which is significantly higher than that of lead, which has a density of 11.3 g/cc. Many tungsten alloys also have densities that are greater than, and often much greater than, the density of lead, with many tungsten alloys having a density greater than 15 g/cc. By having such a high density, tungsten and its alloys can be mixed with other metal, polymer, or other materials to form a composite material that still has a sufficient density to be used as a lead substitute, such as a density that equals that of lead, that is greater than that of lead, that is near the density of lead, etc.

In many applications, tungsten-containing materials are utilized in powder metallurgy applications. As such, these powder-form materials may be referred to as tungsten-containing powders. These powders may be utilized alone, although they are often mixed with other materials, such as one or more binders, lubricants and the like. During formation of these articles via powder metallurgy, factors to be considered are the strength and density of the article, as well as the flowability of the tungsten-containing powder used to form the article. For example, if a particular powder blend produces sufficiently dense and strong articles, it still may not be commercially viable if the powder used to form the articles does not readily flow and therefore cannot be effectively distributed in an automated or other mechanized (typically large scale) manufacturing process. Similarly, a tungsten-containing powder that flows sufficiently well to be used in mechanized (preferably larger scale) processes, but which does not yield sufficiently dense or strong articles also is not commercially viable.

Another consideration is the availability of the tungsten-containing material. For example, if a particular material performs well, such as in the criteria described above, but is very scarce and/or prohibitively expensive compared to other available materials, then this material may not be a commercially viable lead substitute simply because it cannot be obtained in sufficient quantities for larger scale manufacturing processes and/or obtained in sufficient quantities at a commercially acceptable price. Therefore, it is desirable for a tungsten-containing material that will be used as a lead substitute to be at least substantially formed from a material that is reliably commercially available in larger quantities at consistent quality levels and relatively stable prices. As an aspect of this factor, for some materials, the effectiveness of the material for powder metallurgical processes varies, sometimes dramatically, depending upon the particle size of the material being utilized. Therefore, the availability and economics of obtaining a desired tungsten-containing material in a desired form needs to be considered.

One type of tungsten alloy is ferrotungsten, which is an alloy of tungsten and iron. Ferrotungsten is commercially available as a commodity product, with the largest present application of ferrotungsten being a feedstock component for many steels such as steels used to make high-speed cutting tools. Conventionally, ferrotungsten is utilized by the steel industry with consideration essentially only being given to the weight percentage (wt %) of tungsten in the ferrotungsten. In other industries, such as the firearms industry, tungsten, ferrotungsten, and other tungsten alloys are being used to form non-toxic firearms projectiles, such as via powder metallurgy and melt and cast/quench techniques. Conventionally, consideration is given to the bulk density of ferrotungsten, namely, the theoretical and actual density of articles produced from ferrotungsten, with the theoretical density being calculated based on the overall weight percentage of ferrotungsten in the article being produced.

SUMMARY OF THE DISCLOSURE

The present disclosure is directed to systems and methods for refining or otherwise processing tungsten alloys, including ferrotungsten, to powder and articles formed therefrom, and to methods for detecting the presence of processed tungsten alloys according to the present disclosure. Utilizing methods according to the present disclosure, ferrotungsten or other tungsten alloy powder is subjected to at least one separation step, and in some embodiments, at least two separation steps. In some embodiments, the separation step or steps includes at least one magnetic separation step and/or at least one size-based separation step. For example, the powder may be separated to remove fine particles, and optionally to separate the remaining particles into fractions containing selected particle size distributions. The powder additionally or alternatively may be separated into at least magnetic and non-magnetic fractions. In some embodiments, selected fractions resulting from the size and magnetism separation steps are utilized to provide a ferrotungsten-containing feedstock from which articles are produced. In some embodiments, portions of two or more size and magnetism fractions are thereafter mixed and/or further processed to provide a ferrotungsten-containing feedstock. In some embodiments, some fractions are utilized as a feedstock for one type of application, such as powder metallurgy applications, while other fractions are utilized as a feedstock for other applications, such as molten feedstock applications.

BRIEF DESCRIPTION OF THE DRAWINGS

FIG. 1 is a schematic representation of bulk ferrotungsten powder.

FIG. 2 is a schematic representation of bulk ferrotungsten powder in which larger particles have been removed.

FIG. 3 is a flow chart illustrating examples of powder processing methods according to the present disclosure.

FIG. 4 is a schematic view of an ultrasonic screening assembly that may be used with powder processing methods according to the present disclosure.

FIG. 7 is a schematic representation of the bulk ferrotungsten powder of FIG. 1 further illustrating that the particulate forming the bulk ferrotungsten powder also includes at least magnetic and non-magnetic components.

FIG. 8 is a schematic representation of an example of a magnetic separation assembly that may be used with powder processing methods according to the present disclosure.

FIG. 9 is a schematic representation of another example of a magnetic separation assembly that may be used with powder processing methods according to the present disclosure.

FIG. 10 is a schematic representation of another example of a magnetic separation assembly that may be used with powder processing methods according to the present disclosure.

FIG. 11 is a schematic representation of another example of a magnetic separation assembly that may be used with powder processing methods according to the present disclosure.

FIG. 12 is a schematic representation of another example of a magnetic separation assembly that may be used with powder processing methods according to the present disclosure.

FIG. 18 is another flow chart illustrating additional examples of methods for separating ferrotungsten-containing powders according to the present disclosure.

FIG. 19 is a schematic diagram illustrating examples of powder processing, or fractionating, systems according to the present disclosure.

DETAILED DESCRIPTION AND BEST MODE OF THE DISCLOSURE

Figure 5:
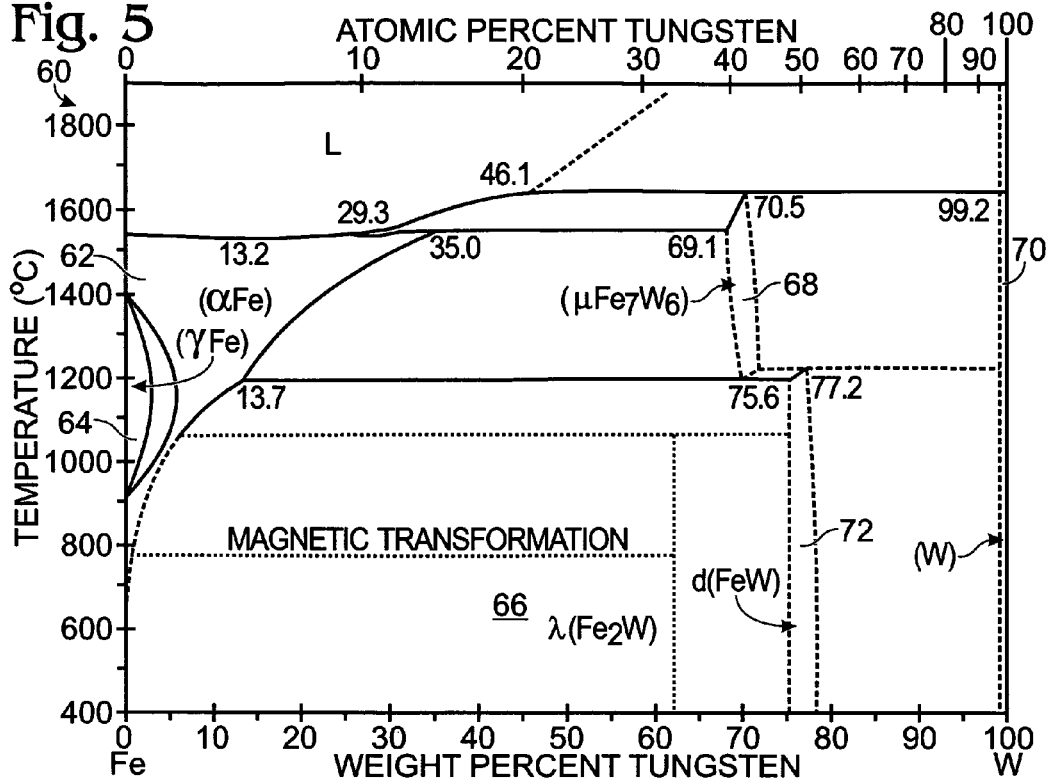
FIG. 5 is an iron-tungsten binary phase diagram.

A sample of ferrotungsten-containing powder is schematically illustrated in FIG. 1 and generally indicated at 10. As shown, powder 10 includes particulate having a variety of particle sizes and shapes, with the relative shape of the particles being illustrated as spheres simply for the purpose of schematic illustration. Typically, these particle sizes will include very small particles, such as −325 mesh particles 12 and larger +325 mesh particles 14. It should be understood that −325 mesh means that the particles are sufficiently small to pass through a 325 mesh screen, and that +325 mesh means that the particles are sufficiently large that they will not pass through a 325 mesh screen. As schematically illustrated in FIG. 1, the illustrated +325 mesh particles 14 include larger particles, which are generally indicated at 18 and refer to particles that will not pass through a 60 mesh screen, such as +60 mesh, +50 mesh, +40 mesh and larger particles, as well as intermediate particles, which are generally indicated at 16 and which are smaller than particles 18, such as being −60 mesh or −100 mesh. Powder 10 may be obtained through any suitable grinding process, including batch and continuous processes, for reducing larger pieces of ferrotungsten into powder form. For example, rotary ball mill autogenous grinding has proven to be an effective method, although others may be used without departing from the scope of the present disclosure. By way of background, a 400 mesh screen has openings of approximately 26 micron, a 325 mesh screen has opening of approximately 44 micron, and a 100 mesh screen has openings of approximately 150 micron.

In FIG. 2, the schematically illustrated ferrotungsten-containing powder from FIG. 1 is shown with larger particles removed to schematically depict a sample of ferrotungsten-containing powder in which powders that are larger than a selected size have been removed. This screened, or separated, ferrotungsten-containing powder, which is generally indicated at 20, may be referred to as "by down" powder in that it includes all powder that passes through a predetermined screen size. For example, prior to utilizing the separation processes described herein, it may be desirable (although it is not required) to precede the fine particle and magnetism separation steps with at least one conventional screening step in which a selected size of particles (such as +40 mesh, +60 mesh, +80 mesh, +100 mesh, etc.) are removed by passing the powder through an appropriate screen structure. As shown and schematically illustrated in FIG. 2, larger particles 18 have been removed from the powder. It is within the scope of the disclosure that this initial screening step may also be used to remove intermediate particles 16 that are larger than a selected particle size, such as larger than 100 mesh, 120 mesh, etc. It is also within the scope of the disclosure that the subsequently described fine particle removal and magnetic separation steps may be performed on ferrotungsten-powder 10 from which the larger particles have not been removed.

As used herein, the terms "powder" and "particles" are meant to include particulate having a variety of shapes and sizes, including generally spherical or irregular shapes, flakes, needle-like particles, chips, fibers, equiaxed particles, etc. As used herein, the term "bulk ferrotungsten powder" refers to the powder produced by grinding ferrotungsten, without the powder being separated into particle sizes, with the exception of an optional separation to remove larger remnants from the grinding process, such as larger sized particles and other masses that will not pass through a 40 mesh screen (+40 mesh particles and pieces). As used herein, the term "ferrotungsten-containing powder" is meant to refer to powder that, at a minimum, includes ferrotungsten as a majority component, and which may be completely comprised of ferrotungsten. For example, powders that contain 51-100 wt % ferrotungsten, at least 60 wt %, 60-95 wt %, and 70-95 wt % ferrotungsten may be referred to as ferrotungsten-containing powders according to the present disclosure. Similarly, as used herein, the term "ferrotungsten-containing material" refers to material (regardless of its powder, molten, solid, or other form) that contains ferrotungsten as a majority component, and which may be entirely formed from ferrotungsten.

Experiments have proven that some ferrotungsten particle sizes are more desirable for powder metallurgy processes than others. For example, removing larger particles, such as particles greater than 100 mesh (+100 mesh) tends to improve the strength and resulting density of articles formed via powder metallurgy from a ferrotungsten-containing powder. However, the resulting −100 mesh powder, while useful to form lead substitute articles, tends to be difficult to utilize on a larger scale because the powder does not flow well and tends to clump and agglomerate in the powder transport conduits and other machinery and devices used to form articles from tungsten-containing powder.

In experiments, it has been determined that the flowability of tungsten-containing powder, such as powders 10 and 20, is substantially improved if fine particles 12 are removed from the powder. In experiments, a 325 mesh screen has proven to be an effective partition, or particle size boundary. It is within the scope of the present disclosure that other partition sizes may be implemented, such as 355 mesh screens, 315 mesh screens, 300 mesh screens, 270 mesh screens, screens in the range of 250-355 mesh, screens in the range of 275-325 mesh, etc.

The difficulty that arises from these fine particles in many powder metallurgy applications is that they tend to coat the larger particles and impair the particles from flowing through the desired powder conduits and other processing machinery and devices. More specifically, surface static charges tend to cause these fine particles to coat and bind to themselves to the larger particles, thereby resulting in powder that visibly agglomerates and does not flow well. As discussed in more detail herein, this is especially true in the context of fine particles 12 that are magnetic. The inclusion of more than at least approximately 15-20 wt % of these fine particles (on a by down basis) also tends to produce articles having a lower overall density than would otherwise be expected for an article formed from a tungsten-containing powder. Therefore, the conventional solution to this lower-than-expected density is to include pure tungsten powder into the powder mixture and/or to include other high-density tungsten alloy powders to increase the bulk density of the resulting article. However, the inclusion of these additional tungsten-containing powders also undesirably increases at least the materials expense of the article. In some situations, it may also lead to the inclusion of other elements in the powder (and resulting articles), which may limit the applications for which the resulting powder may be used. For example, many higher density tungsten alloys include nickel, and nickel is undesirable in some tungsten-containing steels.

Although it has been discovered that removal of these fine particles is desirable in many powder metallurgy applications, traditional screening techniques have not proven effective to remove fine particles from ferrotungsten-containing powders 10 and 20. For example, experiments have demonstrated that some ferrotungsten powder cannot be effectively screened to 200 mesh, or even 100 mesh, because of particle agglomeration. As discussed, the static surface charges tend to cause the fine particles to coat and thereby travel with the larger particles. As a result, the fine particles tend to remain with the larger particles instead of passing through the 325 (or other) mesh screen used to remove the fine particles. As discussed in more detail herein, the present disclosure addresses methods for removing at least a substantial portion of these fine particles 12, if not a significant portion, or even all or nearly all of these particles. The present disclosure also addresses methods for further processing ferrotungsten-containing powder, including powder from which at least a substantial portion of the fine particles have been removed. In some applications, the fine particles may be desirable, and perhaps more desirable than larger particles. Therefore, the removed fine particles are not merely to be discarded, and in fact, may have substantial value for certain applications.

Illustrative methods for processing tungsten-containing powders according to the present disclosure are shown in FIG. 3 and generally indicated at 30. As shown in dashed lines at 32 in FIG. 3, a source 34 of ferrotungsten is ground into powder. As discussed, this grinding step may be performed via any suitable method. Step 32 is indicated in dashed lines to graphically depict that a process which begins with ferrotungsten-containing powder that was previously ground or which was obtained in powder form is still within the scope of the present disclosure. The previously described optional prescreening step(s), in which particles that are larger than a selected screen (or other) size are removed from the powder, is indicated in dashed lines at 36, with the dashed lines being again used to indicate that this step is not required. As discussed, any suitable sieve or screen structure may be used for prescreening step(s) 36. For example, conventional SWECO™ screens have proven effective for this purpose.

At 38, at least a substantial portion of fine particles 12 are removed from the bulk (or by down) ferrotungsten-containing powder 10 (or 20). For the purpose of simplifying the following discussion, the methods will be applied to processing by down powder 20, although the methods are applicable to powder 10 and/or other mixtures of (ferro) tungsten-containing powders as well. As used herein in the context of the amount of a particular particle size, or particle type, removal of "at least a substantial portion" of the particles refers to removal of at least 75% of the particles, removal of "at last a significant portion" of the particles refers to removal of at least 90% of the particles, and removal of "all or nearly all" of the particles refers to removal of at least 98% of the particles. As indicated in FIG. 3, the fine particle removal step results in a quantity, or fraction, 40 of powder that is at least substantially comprised of fine particles and a quantity, or fraction, 42 of powder from which at least a substantial portion of the fine particles has been removed. As discussed in more detail herein, both fractions 40 and 42, and controlled mixtures thereof, may be used to produce ferrotungsten-containing articles. As is also discussed in more detail herein, the fractions are not equally applicable to all applications and formation techniques. For example, fraction 42, which is at least substantially free of fine particles (i.e., from which at least a substantial portion of the fine particles have been removed), may be better-suited for producing articles via powder metallurgy processes.

As discussed, conventional screening techniques have not proven effective at removing fine particles 12 from ferro-tungsten-containing powder. However, experiments have proven that an ultrasonic screening process (as indicated in dashed lines at 50 in FIG. 3) is effective at removing fine particles 12. Ultrasonic screening processes apply high-frequency vibrations to a screen assembly. These vibrations break up or otherwise dissociate particle agglomerations and reduce friction between the powder to be separated and the screen, thereby increasing the ability of the screen to separate the powder according to particle size. An example of an ultrasonic screen assembly is schematically illustrated in FIG. 4 and generally indicated at 52. As shown, the assembly includes at least one screen 54 and at least one ultrasonic generator, or emitter, 56 that is adapted to emit high frequency electrical oscillations that are converted to mechanical ultrasonic vibrations and transmitted to screen 54.

Ultrasonic screening process 50 may include one or more ultrasonic screen assemblies 52, with each assembly including at least one screen 54 and at least one generator 56. When more than one ultrasonic screen assembly is used, the screens may have the same or different screen sizes, i.e., the same or different mesh or opening sizes. In experiments, ultrasonic screening processes have been demonstrated to effectively remove at least a substantial portion of fine particles 12 from bulk and/or a selected size of by down ferrotungsten particles, such as −200, −150, or −100 mesh by down ferrotungsten-containing powders. The ultrasonic screen assembly receives ferrotungsten-containing powder to be separated, such as powder 10 or 20, and separates the powder into at least fractions 40 and 42. By "at least," reference is made to the fact that the screening assembly may include two or more screens that have different sizes, and thereby may produce subfractions of fraction 42. In FIG. 4, screen 54 has been schematically illustrated. The ultrasonic or other screening or size-based separation process may be referred to as removing particles having a size that exceeds a selected particle size threshold.

It is within the scope of the disclosure that any suitable screen configuration and size may be used. Similarly, and as mentioned above, ultrasonic screen assemblies 52 may include more than one screen (or deck). In experiments, a two-screen assembly that included 100 and 325 mesh screens has proven effective, with a 100 gram sample of −100 mesh by down ferrotungsten powder 20 being separated into approximately 95 grams of +325 mesh particles 14 and approximately 5 grams of −325 mesh fine particles 12. Other single, double and multiple screen configurations may be used and are within the scope of the present disclosure. Another example of a suitable screen assembly is adapted to not only remove fine particles, but also to subdivide the remaining particles into at least a −100/+200 mesh fraction and a −200/+325 mesh fraction.

Another aspect of the present disclosure relates to separation of ferrotungsten-containing powder according to the magnetism of the powder particles. This aspect may be used with, or independent of, the previously described size-based separation process(es). More specifically, ferrotungsten generally has a bulk density in the range of 14-15 g/cc. Conventionally, ferrotungsten powder (and larger masses) is utilized without subdivision into discrete density ranges. For example, the expected, or theoretical, bulk density of an article containing ferrotungsten (whether in powder or molten form) is conventionally calculated using the rule of mixtures based on the amount of ferrotungsten present in the article. According to this aspect of the present disclosure, ferrotungsten-containing powder may be magnetically separated into two or more fractions based on the relative magnetism of the particles making up the powder. As discussed in more detail herein, these fractions have differences in their relative properties (apart from whether or not they are ferromagnetic), such as one or more of flowability, melting point, hardness, and density. Relatedly, the relative properties of the magnetically separated fractions may be selectively used, or exploited, to produce articles therefrom.

Figure 6:
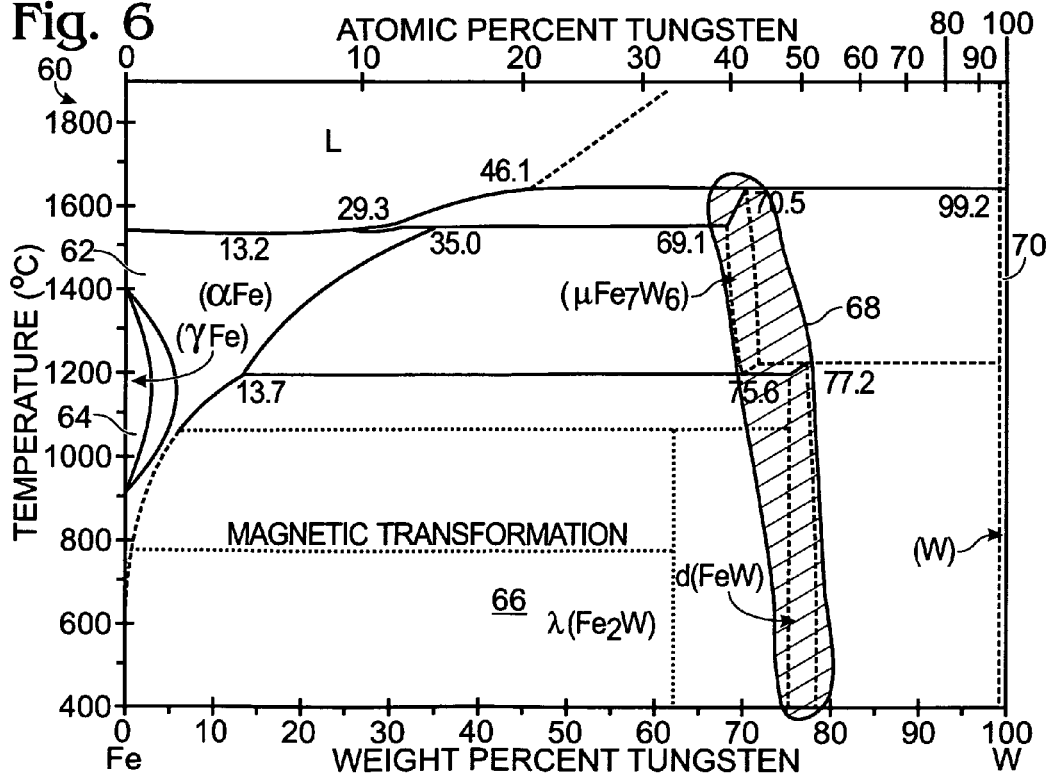
FIG. 6 is a variation of the iron-tungsten binary phase diagram.

FIG. 5 depicts at 60 an iron-tungsten phase diagram, as presented on page 1124 of the "Metals Handbook" and based on work by Sriramamurthy et al. in the 1970's and 1980's. As depicted, several distinct phases are present, including a BCC (body centered cubic) Fe phase 62, a FCC (face centered cubic) Fe phase 64, a Laves/lambda $Fe_2W$ phase 66, a mu $Fe_7W_6$ phase 68 and a BCC W phase 70. Also shown in FIG. 5 is a FeW phase 72, but subsequent research, such as work performed by Gustafson et al. indicate that this phase is actually part of the $Fe_7W_6$ phase, as indicated somewhat schematically in FIG. 6.

Part of the uncertainty about the particular phases and phase boundaries present in the Fe—W binary alloy system may stem from the fact that the $Fe_7W_6$ phase, the proposed Fe—W phase, and the previously proposed $Fe_3W_2$ phases all are near a 1:1 atomic ratio. Also, several of these phases create solid solutions. For example, some tungsten may dissolve into the FCC and BCC iron phases to produce a solid solution of tungsten in iron. Similarly, some iron will dissolve in BCC tungsten phase 70, thereby producing a solid solution of iron in tungsten. Furthermore, atoms of tungsten and/or iron are likely to be dissolved in $Fe_7W_6$ phase 68 and thereby create a phase that actually presents a range of compositions. Another consideration is that the phase diagram indicates the phases that are present, or believed to be present, when the alloy is in thermal equilibrium. However, temperature differences and/or non-equilibrium cooling rates, such as during and/or after formation of the ferrotungsten alloy, may shift the phase diagram and/or create one or more metastable phases. Even equilibrium phases may appear and/or disappear at different temperature ranges. For example, BCC iron phase 62 transforms to the FCC iron phase when it is heated above 912° C.

Commercial utilization of ferrotungsten alloy conventionally addresses the bulk composition (such as the weight percentage of tungsten in the alloy) and the bulk density of the alloy. However, and according to aspects of the present disclosure, it has been discovered that various discrete phases possess different properties, which may be exploited and thereby produce powders (and resultant feedstocks and articles produced therefrom) that may have a greater commercial value than the original alloy from which they are harvested. For example, some of the ferrotungsten phases are (ferro)magnetic, while others are non-magnetic, or only weakly magnetic. More particularly, BCC iron (or BCC ferrite) phase 62 and Laves $Fe_2W$ phase 66 are both magnetic, while FCC iron phase 64, metastable $Fe_7W_6$ phase 68 and BCC tungsten phase 70 are all non-magnetic.

As used herein, the terms "magnetic" and "non-magnetic" refer to the relative ferromagnetism exhibited by the bulk phases, particles, powder, etc. It should be recognized that small amounts of iron in some tungsten phases and vice versa may marginally affect the magnetism (or lack thereof) of a particular phase if these "impurities" were not present. Therefore, for the purpose of simplifying this discussion, the phases will typically be referred to as being magnetic or non-magnetic even though variations in the magnetism of the phases may occur. Similarly, in addition to the above variation in ferromagnetism, a particle of ferrotungsten-containing powder may not be entirely formed from a magnetic or a non-magnetic phase. This too may affect the ferromagnetism of a particular powder particle. Additional factors include the fact that commercially available ferrotungsten is often not produced at thermal equilibrium (and thus will not exhibit the distinct phases and/or phase boundaries illustrated in FIGS. 5 and 6) and may include impurities, such as metals other than tungsten or iron. Similarly, the iron content may vary in commercially available ferrotungsten.

The following discussion will describe the methods in the context of processing ferrotungsten-containing powders. However, it is within the scope of the present disclosure that the methods may be utilized to process powders of other tungsten alloys that may be separated into magnetic and non-magnetic fractions. For example, the methods described and/or illustrated herein may be used to process alloys of tungsten and at least one of iron, nickel and cobalt so long as these powders may be separated into magnetic and non-magnetic fractions. These alloys also may include additional elements, such as copper and/or molybdenum.

As discussed in more detail herein, the differences in magnetic properties between the iron-tungsten phases may be exploited to divide ferrotungsten-containing powder into at least magnetic and non-magnetic fractions. While this separation may not be possible with a large monolithic mass of ferrotungsten, it is possible with ferrotungsten-containing powder, such as powders 10 or 20 and/or fractions 40 or 42. The value of these separated fractions to commercial applications, including applications in which lead substitutes are to be formed, may be better appreciated when it is considered that the phases also tend to differ in density. For example, BCC iron phase 62 has a density of at least 7.86 g/cc and may approach densities of approximately 14-15 g/cc, depending upon the amount of dissolved tungsten. FCC iron phase 62 has a density of approximately 8.0-8.5 g/cc, depending upon the amount of dissolved tungsten contained therein. Laves (lambda) $Fe_2W$ phase 66 has a density of approximately 13 g/cc. $Fe_7W_6$ (mu) phase 68 has a density of approximately 14.6-14.7 g/cc. BCC tungsten phase 70 has a density of approximately 19 g/cc, depending upon the amount of dissolved iron. The distinction perhaps becomes more apparent when it is considered that the primary magnetic phases have densities of approximately 7.86-15 g/cc (and more likely 7.86-13 g/cc for most applications), while the primary non-magnetic phases have densities of approximately 14.6-19.3 g/cc. When the relative weight percentages of the magnetic and non-magnetic fractions are considered, as discussed in more detail herein, the non-magnetic fraction has a bulk density of approximately 18 g/cc, and the magnetic fraction has a bulk density of approximately 13 g/cc.

The magnetic fraction generally has a lower melting point, due to its lower tungsten content, than the non-magnetic fraction, and therefore may be selectively utilized in melt-and-cast processes and/or to form sintered articles without requiring as high of temperatures as would be required if ferrotungsten that has not been magnetically separated was used. Similarly, the non-magnetic fraction tends to exhibit less hardness than the magnetic fraction and better flowability. Accordingly, the non-magnetic fraction, and articles produced therefrom may be processed and utilized with less wear on tooling and equipment, as compared to the wear that would be encountered if the magnetic fraction or ferrotungsten that has not been magnetically separated were used. For example, in experiments, tooling formed from M2 tool steel exhibited little wear after producing more than 100,000 parts from the non-magnetic fraction, while similar tooling exhibited significant wear after producing only a few thousand parts from ferrotungsten-containing powder that had not been magnetically separated. Therefore, while many tooling and other structures conventionally need to be formed from tungsten carbide to guard against wear from ferrotungsten or articles produced therefrom, the selective harvesting of the non-magnetic fraction from ferrotungsten-containing powder may produce a medium- or high-density powder that may be used to produce articles without requiring the use of tungsten carbide or other high-hardness (typically more expensive) tooling.

Although there is some dispute as to the precise identity and boundaries of the phases present in ferrotungsten, experiments have demonstrated that a quantity of ferrotungsten powder may be separated into at least a magnetic fraction and a non-magnetic fraction based upon the relative magnetism of the particles forming the powder. This is schematically illustrated in FIG. 7, in which the schematically illustrated bulk ferrotungsten powder 10 from FIG. 1 is shown including both magnetic 80 and non-magnetic particles 82. As illustrated, the magnetic properties of the particles are not clearly delineated by particle size and instead some of each particle size is shown containing both magnetic and non-magnetic particles.

An illustrative example of a magnetic separation assembly is schematically illustrated in FIG. 8 at 90. As shown, assembly 90 includes at least one magnetic source 92, which is adapted to attract the magnetic particles in the powder to be separated. Suitable magnetic sources 92 include, but should not be limited to, permanent magnets and electromagnets. Magnetic source 92 may include more than one magnet, such as by including a plurality of magnets, with the plurality of magnets oriented in any suitable orientation, including same- and reverse-polarity configurations. It is within the scope of the present disclosure that the distance between the magnetic source and the powder to be separated (at the point (or range) of desired separation) may vary within the scope of the disclosure. Experiments have demonstrated that separation distances of approximately one inch or less have proven effective. For example, distances in the range of 1/16-1/2 inch and 1/8-1/4 inch may be used, although it is within the scope of the present disclosure that distances in the range of 1/2-1 inch and distances that exceed 1 inch may be used. For example, the relative strength of the magnetic field emitted by the source may affect the degree of separation produced thereby, as compared to other sources having stronger or weaker magnetic fields.

In the context of the degree to which the strength of the magnetic source affects the separation produced thereby, experiments have demonstrated that approximately 10-20 wt % of the ferrotungsten-containing powder may be described as being weakly magnetic, in that it tends to be separated initially into the non-magnetic fraction but may be removed therefrom through the application of magnetic sources with stronger/greater magnetic fields. This additional separation step should increase the apparent and tap densities of the nonmagnetic fraction. If the weakly magnetic fraction is added to the magnetic fraction, this also may, and typically will, increase the apparent and tap densities of the magnetic fraction. In an illustrative experiment, a 396.5 gram sample of a non-magnetic fraction was obtained using a magnetic source and separation processes that produce an approximately 50-50 wt % division of ferrotungsten-containing powder into magnetic and non-magnetic fractions, with the original powder having at least a significant amount of the fine particles previously removed therefrom. This sample had apparent and tap densities of approximately 8.95 g/cc and 10.25 g/cc, respectively. The sample was subjected to two refinement steps in which stronger and then stronger again magnetic fields were applied than were utilized to produce the approximately 50-50 wt % separation of magnetic and non-magnetic fractions. In the first magnetic refinement step, 51.2 grams of weakly magnetic powder were removed, with this powder having apparent and tap densities of 8.33 g/cc and 9.58 g/cc, respectively. In the second refinement step, an additional 23.7 grams of (even more) weakly magnetic material were removed and had apparent and tap densities of 8.61 g/cc and 10.08 g/cc, respectively. The refined non-magnetic fraction had apparent and tap densities of 9.69 g/cc and 11.05 g/cc, respectively.

Some magnetic separation assemblies 90 will include one or more of a support, or platform, 94 for the powder to be separated, a suitable drive assembly 96 that is adapted to effect relative movement between the magnetic source(s) and the powder to be separated, and/or a feed assembly 98 that is adapted to deliver (continuous or batch-wise) quantities of powder to be separated onto platform 94 and/or otherwise into a position for separation by magnetic source 92. Drive assembly 96 may also selectively, such as depending upon the particular implementation, be referred to herein as an engagement mechanism and/or as a conveyor assembly. For example, drive assembly 96 may move a magnetic source relative to powder on a stationary support 94, move powder on a moving support relative to a stationary magnetic source, or move both the magnetic source and the powder to be separated. Feed assembly 98 generally represents any suitable device for selectively delivering a quantity of ferrotungsten-containing powder (such as bulk, by down, or previously separated powder) for magnetic separation by magnetic source 92. Examples of suitable feed assemblies include hoppers, conveyors and other suitable structure for transporting or otherwise delivering or supplying powder into a region where it may be magnetically separated by magnetic source 92.

In FIG. 9, an illustrative example of a magnetic separation assembly 90 is shown in which the magnetic source is moved relative to the platform that contains the ferromagnetic powder to be separated. As shown, assembly 90 includes a platform 94 upon which ferrotungsten-containing powder 20 is placed. Platform 94 may include any suitable structure for supporting a quantity of ferrotungsten-containing powder (such as powder 10 or 20 or a quantity of powder produced by the above-described fine particle separation process) to be magnetically separated. Preferably, the platform is sufficiently wide that the quantity of powder to be separated during a particular pass, or application, of the magnetic source may be spread on the platform in a sufficiently thin layer for at least a substantial portion (if not a significant portion, or all or nearly all) of the magnetic particles to be drawn to the magnetic source and not buried beneath other particles on the platform. Assembly 90 further includes a magnetic source 92 that moves relative to the platform, such as via drive assembly 96. Drive assembly 96 is schematically illustrated in FIG. 9 as including at least one linkage 99 between a motor or other drive mechanism 100 and the magnetic source. It is within the scope of the disclosure that drive assembly 96 may take any suitable form, such as including conveyor belts, rotating and/or telescoping adjustable and/or fixed-length arms, etc.

As the magnetic source is passed over the powder to be separated, magnetic particles 80 are drawn to the magnetic source, while non-magnetic particles 82 remain on the platform. After being drawn away from the non-magnetic particles, the magnetic particles may then be removed from the magnetic source. As schematically indicated at 102 and 104, the powder is separated into magnetic and non-magnetic fractions. It is within the scope of the present disclosure that the magnetic source may be rotating or otherwise revolving, spinning, translating, or moving about a selected axis while it is being moved relative to the platform. As indicated with dashed lines in FIG. 9, it is also within the scope of the present disclosure that drive assembly 96 may be adapted (such as through a suitable drive linkage 99') to move platform 94 relative to magnetic source 92. As a further variant, drive assembly 96 may be adapted to move both the magnetic source and the platform relative to each other.

At least one of the platform and/or the magnetic source may include, be in contact with, or otherwise be associated with an optional vibration source, such as schematically illustrated in dashed lines at 106 in FIG. 9. Vibration sources 106 are adapted to agitate or otherwise vibrate the powder on the platform. This vibration reduces the amount of non-magnetic particles that become entrained with the magnetic particles, and vice versa. This increased separation may result from the vibrations dislodging entrained particles and/or from the fact that the heavier non-magnetic particles will tend to shift toward the bottom of the quantity of powder to be separated. As a result of this downward shifting of the non-magnetic particles, the comparatively lighter magnetic particles are at, or closer to, the surface of the quantity of powder to be separated and thus in a better position to be drawn to the magnetic source without drawing entrained non-magnetic particles therewith. Vibration sources 106 have been schematically indicated in dashed lines in FIG. 9 partially overlapping platform 94 and magnetic source 92 to graphically depict that it is within the scope of the present disclosure that the vibration sources may be housed and/or integrated within the platform or magnetic source, may be physically mounted on the platform or magnetic source, and/or may be separated from but in communication with the platform or magnetic source. For example, the vibration sources may be in communication with the platform or magnetic source via any suitable linkage or conduit for conveying the vibratory output from vibratory source 106 to the corresponding structure of the magnetic separation assembly.

In FIG. 10, another illustrative example of a magnetic separation assembly is shown in which the platform and magnetic sources are both moved relative to each other. As shown, drive assembly 96 takes the form of a rotating belt 108 that extends around a magnetic source in the form of a drum 110. For example, drum 110 may have at least one magnetic source mounted therewithin or thereupon, may be at least partially formed from a magnetic source, etc. Ferrotungsten-containing powder to be separated is fed onto the belt by feed assembly 98, and the belt is driven by any suitable drive assembly 96. For example, the belt may be driven by rotation of the magnetic drum (which in such an embodiment forms a portion of the drive assembly), by at least one driven gear or roller assembly, or by any other suitable mechanism that propels the belt around the drum. As the powder passes over the drum, the magnetic particles are drawn toward the drum, and at least temporarily retained on the belt, while the non-magnetic particles fall off of the belt and are collected, such as in a suitable collection vessel 112. Also shown in FIG. 10 is a collection vessel 122 that is positioned to receive the magnetic particles. In such an embodiment, the length of the conveyor and the number and shape of the magnetic sources may vary without departing from the scope of the disclosure. As a further alternative, belt 108 may be at least partially formed from, or include, magnetic source 92. In FIG. 10, feed assembly 98 is schematically illustrated in an elevated position relative to belt 108, while in the subsequently described FIG. 12, the feed assembly is illustrated in contact with the belt. These illustrative positions are intended to graphically depict that the relative orientation and position of the feed assembly may vary with respect to any drive assembly and/or support without departing from the scope of the present disclosure.

In FIG. 11, an illustrative example of a suitable magnetic separation assembly is shown in which the assembly does not include a platform that supports the ferrotungsten-containing powder as the powder is separated by the magnetic source. Instead, the powder is released from above the magnetic source. The ferrotungsten-containing powder (20, 10, etc.) may be released for exposure to the magnetic source by feed assembly 98, which may utilize any suitable manual, mechanized, automated, or other mechanism. As the powder falls, the magnetic particles are drawn into contact with and retained by the magnetic source, while the non-magnetic particles are not so drawn and instead are collected in a suitable collection vessel.

In FIG. 12, a variation of the assembly of FIG. 11 is shown and includes a platform 94 in the form of a belt or other suitable conveyor 108 that is rotationally driven by a drive assembly 96. Belt 108 includes a terminus 114 at which the powder (20, 10, etc.) carried by the belt is released to fall toward the magnetic source. The vertical orientation of terminus 114 relative to the magnetic source may vary within the scope of the present disclosure. The illustrated embodiment may be configured to take advantage of the density differences between the magnetic and non-magnetic particles by orienting the terminus such that the lowest layer of particles released by the conveyor are farther away from the magnetic source than the corresponding highest layer of particles. Because the non-magnetic particles are denser than the magnetic particles, the non-magnetic particles will tend to settle toward the belt prior to release of the particles. As a result, the upper layer of particles will contain a disproportionate percentage of magnetic particles, and these particles will be released closer to the magnetic source than the non-magnetic particles. As a further optional variant, the belt may include or otherwise be associated with a vibration source 106 to increase the gravity segregation of the particles.

Figure 13:
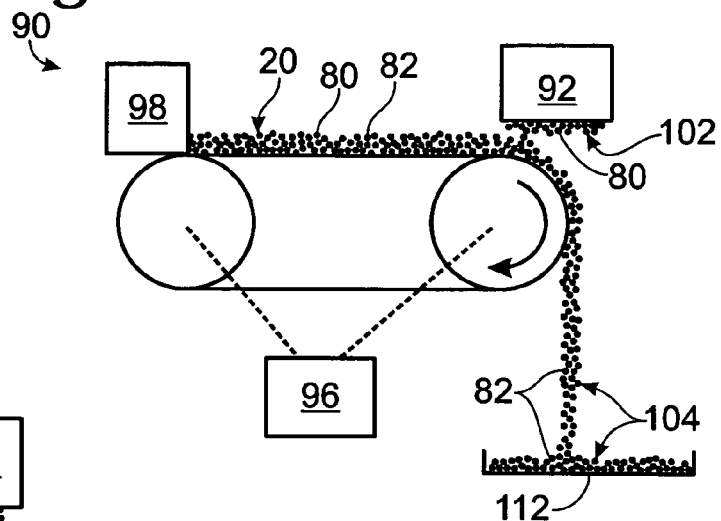
FIG. 13 is a schematic representation of another example of a magnetic separation assembly that may be used with powder processing methods according to the present disclosure.
Figure 14:
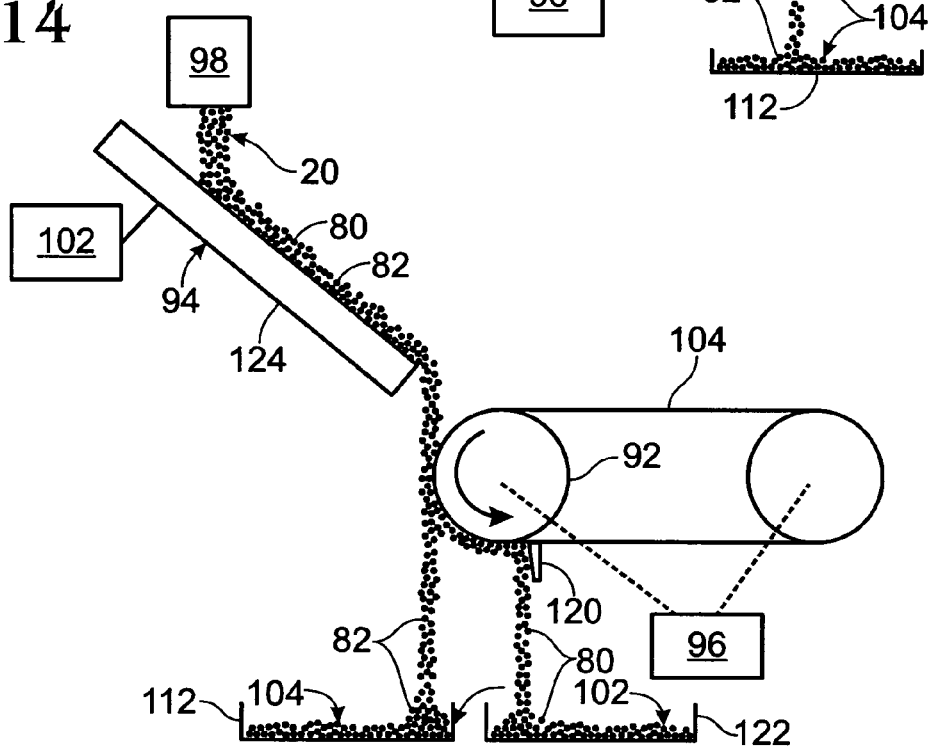
FIG. 14 is a schematic representation of another example of a magnetic separation assembly that may be used with powder processing methods according to the present disclosure.

Additional illustrative examples of magnetic separation assemblies according to the present disclosure are shown in FIGS. 13 and 14. In FIG. 13, magnetic source 92 is schematically illustrated generally above the belt or other conveyor. Ferrotungsten-containing powder to be separated is conveyed toward the terminus 114 of the belt as the belt is rotated by drive assembly 96. Proximate the terminus of the belt, magnetic particles 80 are drawn off of the belt to the magnetic source, while the non-magnetic particles fall off of the belt at the terminus and are collected in vessel 112 or any other suitable collection structure or receiver. The assembly shown in FIG. 13 provides another example of a magnetic separation assembly where the density differences between magnetic and non-magnetic particles may promote separation as the particles are conveyed to the magnetic source. This may be further exploited through the use of a suitable vibration, or agitation, source. This step may be referred to as a gravity separation step or a density-based separation step. FIGS. 10, 12 and 13 collectively and schematically illustrate that in magnetic separation assemblies with belts or other suitable powder-transporting conveyors, the relative position of the magnetic source relative to these belts may vary without departing from the scope of the present disclosure.

In FIG. 14, an example of a magnetic separation assembly is shown that includes structure for removing the magnetic particles from magnetic source 92 while the separation process continues. In the illustrated example, the assembly includes a scraper 120 (or other suitable structure or device for removing magnetic particles 80 from the magnetic source) that removes particles 80 as magnetic source 92 is rotated relative to the scraper. As shown, the magnetic and non-magnetic fractions are collected in respective vessels 112 and 122, although any other suitable receptacle may be used. It is within the scope of the present disclosure that the scraper may additionally or alternatively move relative to the magnetic source. Also shown in FIG. 14 is a platform 94 in the form of a vibrating trough that is utilized to convey the ferrotungsten-containing powder to be magnetically separated from feed assembly 98 toward magnetic source 92.

Regardless of the particular magnetic separation process utilized in a particular embodiment of the magnetic separation assembly, it may be desirable to repeat the separation process with at least one and/or both of the resulting magnetic and non-magnetic fractions to remove any entrained or otherwise misclassified particles.

Experiments have demonstrated that ferrotungsten-containing powder contains approximately a 50-50 (wt %) mixture of magnetic and non-magnetic particles. More specifically, initial experiments using a manually positioned magnetic source produced a non-magnetic fraction that represented approximately 60 wt % of the original sample. However, upon reapplication of the magnetic separation process to the non-magnetic fraction, approximately 10 wt % of this fraction was drawn to the magnetic source. More detailed implementations of magnetic separation processes according to the present disclosure were applied to 65 and 200 pound samples of ferrotungsten-containing powder and produced non-magnetic fractions of 52 and 51 wt %, respectively.

Analysis of magnetically separated fractions of ferrotungsten-containing powder according to the present disclosure indicate that the magnetic fraction is largely comprised of $Fe_2W$ and BCC Fe and typically has a density of approximately 13.5 g/cc, while the non-magnetic fraction is largely comprised of $Fe_7W_6$ and BCC tungsten (with a minor amount of iron in solid solution) and typically has a density of approximately 17.6 g/cc. As discussed, the fractions are quite likely to contain a minor amount of the other fractions, such as due to the fact that the larger the particle the more likely it is to contain more than one phase, with these phases potentially including both a magnetic phase and a non-magnetic phase. Similarly, the fractions may include other components, such as other metals or impurities that are present in the commercially produced ferrotungsten. Other factors that may affect the relative degree of magnetic separation of a particular sample of ferrotungsten-containing powder include the particle size of the powder, the strength of the magnet(s) or other magnetic source being used to perform the separation, the number of times the separation is performed, such as to selectively remove magnetic particles entrained in the non-magnetic fraction, and vice versa, the degree to which the particles are exposed to the magnetic source, etc.

The presence, or perhaps more particularly, the lack of particular magnetic and/or non-magnetic phases may also be utilized to identify ferrotungsten-containing powder produced according to the present disclosure, as well as to identify articles produced from such powder. An example of a suitable method for determining the particular phases that are present in an article or sample of ferrotungsten-containing powder is X-ray diffraction. Simply put, an article may be subjected to an X-ray diffraction analysis to see if the article contains a disproportionate or complete absence of certain peaks representing specific phases or groups of phases that are conventionally present in ferrotungsten-containing articles. While useful, X-ray diffraction is but one suitable method for detected ferrotungsten-containing powder produced according to the present disclosure. Illustrative examples of other detection processes include, but are not limited to, gravity concentration, electrostatic separation, chemical flotation, color separation, separation based on particle morphology, and separation based on resistances to comminution. When an article is suspected of containing ferrotungsten-containing powder produced according to the present disclosure, the article (or ferrotungsten-containing portion thereof) may be milled or otherwise ground or broken into particles prior to applying the detection process (es).

Figure 15:
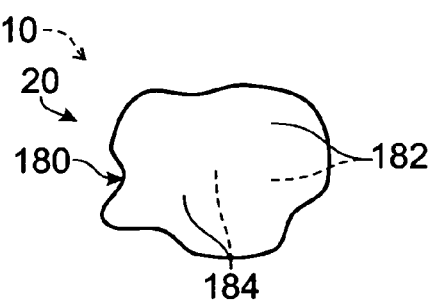
FIG. 15 is a schematic representation of a particle that contains both magnetic and non-magnetic component phases.

Some of the ferrotungsten-containing particles may perhaps more accurately be classified as weakly magnetic, in that they contain both magnetic and non-magnetic phases, with neither of the phases being present in a significant majority to make the composite particle strongly magnetic or strongly non-magnetic. A graphical depiction of such a particle is schematically illustrated in FIG. 15, in which the particle is generally indicated at 180. As shown, particle 180 contains both magnetic 182 and non-magnetic 184 portions, or regions, thereby indicating that it contains at least one magnetic and at least one non-magnetic phase. It is within the scope of the present disclosure that this weakly magnetic fraction may be purposefully separated from one of the resultant fractions, or not, depending for example upon the particular application for which the resultant fractions will be used. As an illustrative example, if for a particular application it is desirable to obtain a non-magnetic fraction with as high of density as possible, then the non-magnetic (denser) fraction may be resubjected to the magnetic separation process to remove weakly magnetic (less dense) particles therefrom and thereby increase the bulk density of the remaining portion of this fraction. Another option for treating particles containing both magnetic and non-magnetic phases is to grind or otherwise comminute the particles to a smaller size, thereby liberating more single-phase (or at least single magnetic/non-magnetic fraction) particles, which may thereafter be separated from each other.

The previously described and illustrated fine powder and magnetic separation processes may be used independently to separate ferrotungsten-containing powders according to the present disclosure. Therefore, while it may be beneficial in some applications and/or with some powder mixtures, it is not required within the scope of the present disclosure for both types of separation processes to be utilized with a particular powder mixture. For example, and as discussed, removing at least a substantial portion of the fine powder present in a bulk or by down quantity of ferrotungsten powder significantly improves the flow characteristics of the powder, and in many applications also improves the density and strength of articles produced by powder metallurgy therefrom. As also discussed, separating ferrotungsten powder into at least magnetic and non-magnetic fractions provides "heavy" and "light" mixtures of powder relative to the bulk density of ferrotungsten. Although both fractions have a density that exceeds the density of lead, the non-magnetic fraction may be more desirable for use in forming lead substitutes because the greater density of this fraction permits a larger weight percentage of other materials, or components, to be mixed with this fraction while still achieving the density of lead (or another selected density of density range, such as a density of at least 8 g/cc, a density of at least 10.5 g/cc, a density of at least 12 g/cc, a density in the range of 9.5-13 g/cc, etc.). As discussed in more detail herein, illustrative examples of these other components include lubricants, filler materials, and metal and/or nonmetal binders. Illustrative examples of binders and/or filler materials that may be used include iron, nickel, copper, cobalt, aluminum, manganese, tin, and mixtures and alloys thereof. Additional examples of binders, filler materials, lubricants and illustrative uses thereof are disclosed in U.S. patent application Ser. No. 10/698,827, the complete disclosure of which is hereby incorporated by reference for all purposes. As also discussed in more detail herein, the density of the article produced using processed ferrotungsten-containing powder according to the present disclosure is a consideration and, at least in the context of non-magnetic fraction 104, is unexpectedly high.

Figure 16:
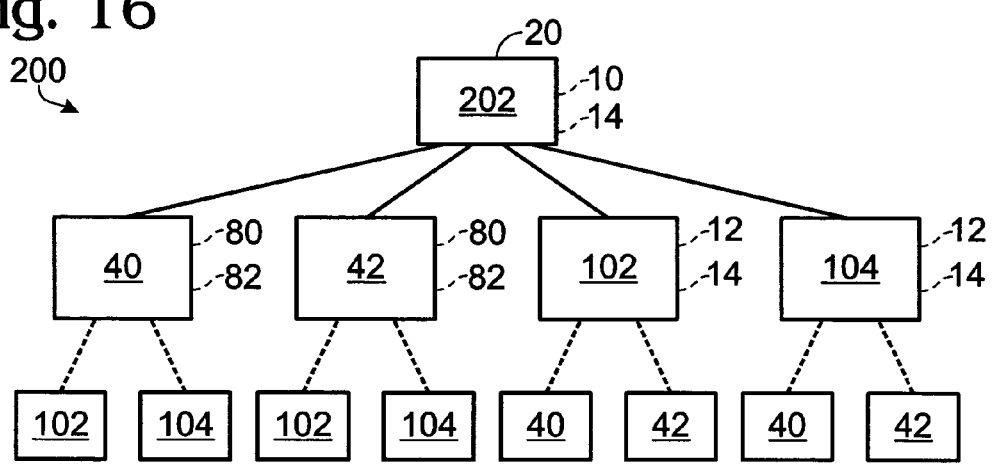
FIG. 16 is a flow chart schematically illustrating examples of other methods for separating ferrotungsten-containing powders according to the present disclosure.

It is also within the scope of the present disclosure to utilize at least one of both the powder-based and the magnetic separation processes to divide a quantity of ferrotungsten-containing powder into fractions, with these fractions including at least one fine particle fraction, at least one fraction in which at least a substantial portion of the fine particles have been removed, at least one fraction that is at least substantially comprised of magnetic particles, and at least one fraction that is at least substantially comprised of non-magnetic particles. By the above, it should be understood that a particular fraction may (but is not required to)

fall within both a particle size and magnetism fraction. Examples of such illustrative methods involving two or more different types of separation processes are schematically illustrated in FIG. 16 and generally indicated at 200. Similar to the previously described processes, the processes are described and schematically illustrated separating ferrotungsten-containing powder 20, but it is within the scope of the present disclosure that any bulk, by down, prescreened or other ferrotungsten-containing powder, including powder 10, may be used.

As shown in solid lines in FIG. 16 at 202 a sample of ferrotungsten-containing powder is separated into at least two fractions. For the purpose of illustration, four different fractions are shown, namely, fractions 40 and 42, which respectively contain powder that is at least substantially comprised of and at least substantially free of fine powder 12, and fractions 102 and 104, which are respectively comprised at least substantially of magnetic and non-magnetic particles 80 and 82. Although not required or essential, it is within the scope of the present disclosure that any of the utilized separation steps, such as those that are schematically illustrated in FIG. 16, may be repeated at least once, such as to provide more complete separation of the ferrotungsten-containing powder. In an implementation of a method according to the present disclosure where the ferrotungsten-containing powder is to be divided by both particle size and magnetism, these separation steps will typically occur sequentially, with at least one of the steps being repeated to provide a more complete separation of the powder. As indicated in dashed lines in FIG. 16, it is within the scope of the present disclosure that one or all of the illustrative fractions that are produced in a particular separation step may be further separated according to at least one other type of separation process. In the graphical example, both particle-size fractions are subsequently separated into magnetic and non-magnetic fractions, and both magnetism fractions are separated into particle-size fractions. The viability of the particular order in which the steps occur will tend to depend upon such factors as the particular composition and particle makeup of the powder mixture to be separated, prior separation steps to which the powder has been subjected and/or the particular types of fine-particle and/or magnetism separation processes to be utilized.

Figure 17:
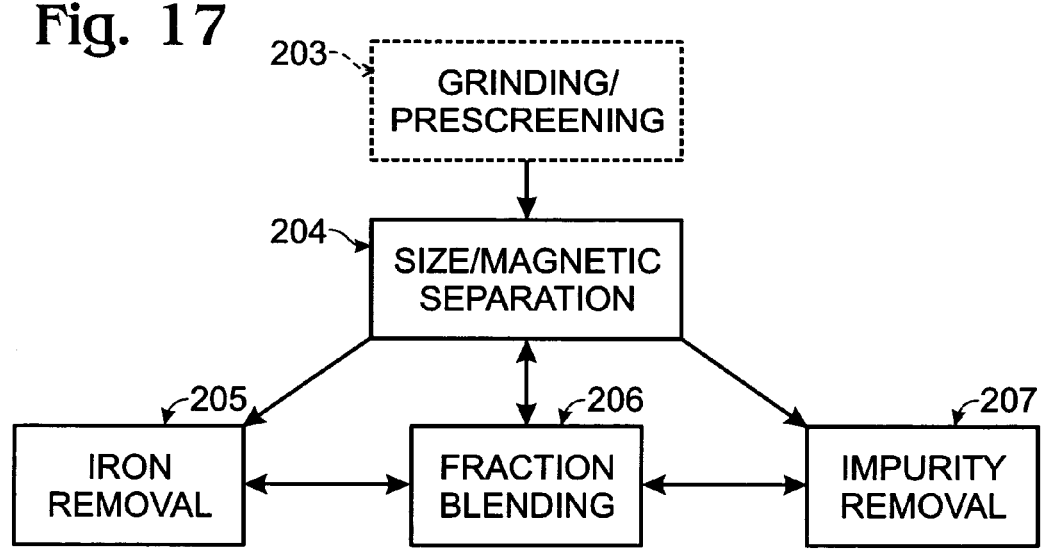
FIG. 17 is a flow chart schematically illustrating examples of other methods for separating ferrotungsten-containing powders according to the present disclosure.

As discussed, the composition of commercially available ferrotungsten-containing powder may vary, such as due to variations in the iron content, impurities, etc. As also discussed, the fractions produced according to the above-discussed size and/or magnetic separation processes may be selectively combined before being utilized to produce articles therefrom. In FIG. 17, illustrative examples of processes are schematically illustrated that may, but are not required to be, utilized in addition to the sizing and/or separation processes described and/or illustrated herein. At 203 and 204, grinding, prescreening, size and magnetic separation processes are schematically illustrated and may represent one or more applications of these processes.

At 205 in FIG. 17, it is schematically illustrated that the tungsten content in a separated fraction may be increased by selectively removing iron from the fraction. This iron removal may be accomplished through any suitable process. For example, a leaching or other chemical process may be used. Another example is through differential vaporization, as iron has a much lower vapor point than tungsten. The removal of iron should increase the density of the remaining material.

At 206 in FIG. 17, it is schematically illustrated that some or all of one or more of the produced fractions may be selectively mixed with some or all of one or more of the other produced fractions. The amount of any particular fraction that is mixed with any other fraction may vary, and it is also within the scope of the present disclosure that non post-separation mixing or blending of the fractions occurs. As an example of an illustrative application of selective mixing of the produced fractions, the addition of some non-magnetic fine particles to the non-magnetic fraction produced through the magnetic separation of powder 42 may increase the strength and density of a resulting article produced through powder-metallurgy. However, these non-magnetic fine particles may somewhat decrease the flowability of the non-magnetic powder that does not include fine particles. In experiments, up to approximately 40 wt % of non-magnetic fine particles did not significantly reduce the flowability of the resulting non-magnetic powder. As another example, any of the separated ferrotungston-containing powder that is not going to be used for powder metallurgy processes may be mixed and then utilized to form a molten feedstock, such as to produce articles through casting, molding, quenching or similar processes. As yet another illustrative example, when it is desirable to magnetically separate the fine powder 12 portion of the ferrotungsten-containing powder, it may be desirable to initially add some coarser powder thereto. The reason for this is that the fine particles tend to agglomerate together and thereby reduce the effectiveness of the magnetic separation. However, the addition of coarser particles appears to dilute the fine particles and permit the magnetic separation to occur much more effectively. The resulting fractions can thereafter be separated, if necessary, for particle size. In experiments, a 2:1 (by volume) ratio of coarse to fine particles was effective, but it is within the scope of the disclosure that greater or lesser proportions may be used.

At 207 in FIG. 17 it is schematically illustrated that the produced fractions may be further processed to remove impurities therefrom. For example, commercially available ferrotungsten often has some degree of slag therein that remains from the smelting process by which it was produced. This slag tends to have a much lower density (typically less than 4 g/cc) than the ferrotungsten-containing fractions. As such, the slag may be removed by any suitable density-based separation process. As an illustrative example, this may be accomplished by the application of Stokes Law or other fluid-dynamics-based classification operation. In experiments, when a stream of non-magnetic fraction was dropped through a transversely flowing air stream, the air stream removed slag particles from the stream. Any other suitable separation process may be used. It is also within the scope of the present disclosure that the ferrotungsten-containing powder may be treated to remove slag or other impurities before the magnetic separation process. Removal of these lower-density impurities should (but is not required to) increase the overall density of the resulting fractions (and articles produced therefrom), as well as potentially reducing inclusions in the finished articles and/or scratching or wear during production and/or utilization of the articles.

It is within the scope of the present disclosure that the iron and/or impurity removal steps may be performed to the ferrotungsten-containing powder prior to the size and/or magnetic separation steps. However, as it may not be commercially beneficial to perform either or both of these removal steps to an entire batch of ferrotungsten-containing powder, one or both of these steps, if performed at all, will typically only be performed to a fraction of the ferrotungsten-containing powder.

Another illustrative example of a separation process for ferrotungsten-containing powder is shown at 208 in FIG. 18. As shown, the method includes both a fine-particle removal step 38 and a magnetic separation step 210. For the purpose of completeness, the method illustrates starting from a ferrotungsten-containing source material that is ground into ferrotungsten-containing powder 10. However, it is within the scope of the present disclosure to begin with preground ferrotungsten-containing powder and/or powder that has been subjected to at least one prescreening step 36. As shown in solid lines at 210, particle-size fractions 40 and 42 are both subjected to magnetic separation into a fraction 102 that is at least substantially comprised of magnetic particles 80 and a fraction 104 that is at least substantially comprised of non-magnetic particles 82. The magnetic separation may be accomplished using any suitable magnetic separation assembly, such as any of the assemblies previously described and/or illustrated herein. Although separately illustrated being subjected to the magnetic separation step, fractions 40 and 42 may be separated using the same or different separation assemblies. At 212, it is graphically illustrated that the magnetic separation step may be repeated at least once and with at least one of the resultant fractions from a prior application of the magnetic separation step.

As indicated at 214 in FIG. 18 (and as previously discussed in connection with FIG. 17), it is within the scope of the disclosure that fractions 40 and 42 may be partially mixed prior to the resultant powder being magnetically separated. As discussed in more detail herein, good magnetic separation may be achieved without requiring complete (or at least substantial) removal of fine particles 12. Therefore, while complete remixing of the fractions would not be desirable, in some applications it may be desirable to mix a portion of fraction 40 with fraction 42, or vice versa.

A less schematic diagram of a method for processing ferrotungsten-containing powder utilizing ultrasonic and magnetic separation assemblies according to the present disclosure is shown in FIG. 19 and generally indicated at 220. As shown, a source 34 of ferrotungsten-containing material is delivered to a grinding apparatus. As an illustrative example, 3-4 inch by down ferrotungsten-containing material is fed into a 4-foot Marcy ball mill and autogenously ground to produce a quantity of ferrotungsten-containing powder 10.

As discussed, the initial quantity of ferrotungsten-containing powder may be subjected to at least one prescreening step prior to being ultrasonically separated to remove fine particles 12. For example, at 226 a stream containing air-blown fine particles 228 is shown. Particles 228 may also be referred to as ultrafine particles, in that they tend to be less than −400 mesh in size and are separated from the rest of the tungsten-containing powder by injecting a pressurized stream of air through the powder. The ultra fine particles may be collected via any suitable mechanism, such as a collection bag or other filter through which the particle-containing air (or other gas) stream is passed. The ultrafine particles may be used in applications for which there is a particular demand for such small particles (either with or without previously undergoing magnetic separation) and/or utilized in applications where the tungsten-containing powder is melted (again, with or without previously undergoing magnetic separation).

At 36, the previously described prescreening step is shown removing at least a portion of the larger particles from the (bulk) ferrotungsten-containing powder produced in the grinding step. In the depicted example, a pair of screen assemblies 230 and 232 are utilized. Continuing the illustrative example from above, a 30-inch Sweco™ screen assembly utilizing a ¼-inch screen 230 and a 40 mesh screen 232 has proven effective. It is within the scope of the present disclosure that the prescreening step may be omitted, and that it may be differently implemented, such as with a single screen assembly, with more than two screen assemblies, with screen assemblies having different mesh sizes, etc.

As indicated at 234, the prescreening step may include recycling at least a portion of the initial output from the mill. For example, when batch-milling processes are utilized, the source material may be "over-ground" and thereby contain a greater percentage of fine particles. When it is desirable to produce less (rather than more) fine particles, a continuous grinding process may be used. Another technique for reducing the amount of fine particles is to operate a batch milling process somewhat incrementally, in that the resultant powder is periodically removed, prescreened, and then the portion that does not pass through the screen assemblies used in the prescreening process is returned to the mill to be reground.

As also illustrated in dashed lines in FIG. 19, fine particles 12 (and preferably at least a substantial portion thereof) may be removed from a quantity 236 of the by down ferrotungsten-containing powder 20. In the illustrated example, the fine-particle separation is accomplished using an ultrasonic screen assembly 52. In this example, a pair of ultrasonic screens 54 and 54' are shown, although it is within the scope of the present disclosure that a greater or lesser number of screens may be used. Continuing the above illustrative example, a 60-inch ultrasonic screen assembly that includes a 100 mesh ultrasonic screen 54 and a 325 mesh ultrasonic screen 54' has proven effective. As shown, the portion of quantity 236 that does not pass through the first ultrasonic screen is recycled to the mill (or other application), with the remaining powder being separated into fractions 40 and 42, with fraction 40 being at least substantially comprised of fine particles 12 and fraction 42 being at least substantially free of fine particles. The illustrative grinding, prescreening and ultrasonic screen assemblies described in this example are selected to produce approximately 200 pounds per hour of fraction 42. The size and/or structures utilized for these steps may vary, such as depending upon the desired rate at which fraction 42 or any of the other fractions described herein, is to be produced. For example, this illustrative assembly may be used to process greater or smaller flows, such as may be desired for selected applications. Similarly, larger or smaller, and/or greater or fewer screen assemblies and/or prescreening assemblies may be used.

At 90, fraction 42 is magnetically separated into magnetic fraction 102 and non-magnetic fraction 104 using a suitable magnetic separation assembly, such as any of the previously described and/or illustrated assemblies 90. The produced fractions may be utilized in a variety of applications, with many of the fractions, or selective blends thereof, being particularly well-suited for certain applications and thereby having greater commercial value than a comparable quantity of bulk or by down ferrotungsten-containing powder.

A benefit of removing at least a portion, and typically at least a substantial portion, of fine particles 12 is that the fine particle separation step(s) produce at least a fraction 42 of powder that will tend to flow better than the quantity of ferrotungsten-containing powder from which the fine particles are removed, such as powders 10 or 20. Furthermore, the magnetic separation step(s) separate the powder into at least magnetic and non-magnetic fractions (and optionally at least a third weakly magnetic fraction). The produced fractions may be used in a variety of applications, with the selection of the particular fraction and/or blend of fractions being selected in part by the particular application to be used. The following description is intended to provide a few illustrative (non-exclusive) examples of how selective use of the fractions produced according to methods of the present disclosure may maximize or otherwise increase the utility and/or commercial value of a quantity of ferrotungsten-containing powder.

Although not required, a factor that may be considered when evaluating the economics of the methods of the present disclosure is that tungsten is generally twice as expensive as ferrotungsten. Therefore, if the non-magnetic fraction produced according to the present disclosure is suitable for use as a substitute for pure tungsten, the remaining magnetic fraction is largely available for other applications with the cost of the ferrotungsten largely recovered through the use of the non-magnetic fraction. Similarly, and as discussed in more detail below, many applications are not discriminatory about the particle size and/or density of the ferrotungsten-containing powder utilized therein. From an economic perspective, these applications offer the advantage that they provide a demand, or market, for any fraction of the ferrotungsten-containing powder for which there is not a more economically desirable application. Expressed in other terms, a baseline demand exists for any available fraction of the ferrotungsten-containing powder, and therefore all of the powder may be used.

Both the magnetic and the non-magnetic fractions, including those that have and have not had fine particles at least substantially removed therefrom, should be useful for producing articles via powder metallurgy processes. Examples of these applications include (but are not limited to) cold compaction processes, press and sinter (both solid-state and liquid-phase) processes, and metal injection molding processes. Furthermore, any of these powder metallurgy processes may optionally be followed by subsequent working of the article, such as by forging, extrusion, swaging, grinding, and sintering or other heat treatment.

To explore the flowability of ferrotungsten-containing powder that contains more than 10 wt % of fine particles, but less than 40 wt % of fine particles, 500 g of −325 by down fine particles 12 was mixed with 1000 g of −100/+325 magnetic fraction particles and then subjected to a magnetic separation process. The resulting magnetic fraction weighed 1249 grams, with the remaining 237.5 grams (13.5 grams was lost in the separation process) constituting the non-magnetic fraction. As the magnetic-non-magnetic split has been demonstrated to be approximately 50%, this example indicates that mixing quantities of fine powder (which, as discussed, tends to agglomerate and prevent effective flow characteristics) with at least twice as much powder in which the fine particles were previously removed tends to "loosen" up the mixture and reduce agglomeration. In contrast, when a sample of −100 mesh by down powder was subjected to the same magnetic separation process, only a poor separation (less than 39 wt % non-magnetic fraction) was obtained. Since approximately 50 wt % of the −100 by down ferrotungsten powder is expected to be in the non-magnetic fraction, this experiment again indicates that some fine particle removal may be necessary to achieve effective magnetic separation of the ferrotungsten powder. However, the 2:1 example discussed above demonstrates that complete removal of the fine particles is not required. In experiments, magnetic particles, and especially magnetic fine particles, tend to flow much less than their non-magnetic counterparts. Therefore, the addition of non-magnetic fine particles tends to have a less significant reduction in the flow of the resulting powder, with this reduction in flow often being outweighed (in the context of the very quick flow characteristics of the non-magnetic fraction produced after fine particle separation) by the increased density and strength that may result by adding some of these particles.

As additional examples, ferrotungsten-containing powder prepared according to the present disclosure for powder metallurgy applications may include, for example, less than 1 wt % fine particles, less than 5 wt % fine particles, less than 10 wt % fine particles, less than 20 wt % fine particles, in the range of 5-15 wt % fine particles, in the range of 10-40 wt % fine particles, etc. Within these illustrative ranges, the fine particles may be a mixture of magnetic and non-magnetic fractions, contain at least a substantial portion, or at least a significant portion, or even all or nearly all of either magnetic or non-magnetic fine particles, etc. Ranges outside of these illustrative examples may also be used without departing from the scope of the present disclosure. As discussed in more detail herein, factors that may affect the amount of fine particles to be used, or which may be effectively used, include (but are not all required to be a factor in every application) the magnetism of the particles, the other components in the powder mixture to be used, the process by which articles will be formed from the powder, the article to be formed, the process and/or devices utilized to transport the powder, etc.

When utilized in powder metallurgy applications, the fraction(s) will typically be mixed with at least one binder. Examples of suitable binders include metal binders (such as tin) and polymeric binders. The composite powder feedstock may additionally include a small (typically less than 1 wt %, such as 0.25 wt % or 0.5 wt %) amount of lubricant, such as Acrawax™ or Kenolube™. In experiments, the addition of lubricant, such as those discussed above, to non-magnetic ferrotungsten-containing powder tends to increase the compressibility of the powder. Similarly, even when variations in the source ferrotungsten results in differing apparent densities of the fractions produced therefrom, the addition of this small amount of wax or other lubricant tends to normalize the tap densities of these fractions.

The fraction(s) optionally may also be mixed with at least one lower density material that is used to produce an article having a lower density than would otherwise be produced if a lower density (non-binder, non-lubricant) component is not used. These lower density materials, if present, may have a variety of compositions, including metal and/or polymer materials that may be used as fillers, binders and/or lubricants. Additionally or alternatively, the produced articles may include a coating or other additional structure or layer and still provide a composite article having a desired bulk density. Illustrative examples of suitable binders and composite compositions (with various proportions of the above-described fractions being substituted for the tungsten-containing materials disclosed therein) are disclosed in U.S. patent application Ser. Nos. 10/041,873 and 10/698,827, pending PCT patent application Serial No. PCT/US03/02579, and U.S. Provisional Patent Application Ser. No. 60/423,232, the complete disclosures of which are hereby incorporated by reference for all purposes.

The utilized fraction(s) may also include some of the removed fine particles (either in bulk, or as magnetically separated into magnetic and non-magnetic fine particle fractions). In experiments, up to approximately 35-40 wt % of non-magnetic fine particles tends to increase the density of the resulting articles without significantly impacting the flowability of the powder mixture. For example, if fine particles are reintroduced into the powder metallurgy mixture, these particles may be selectively magnetic or non-magnetic, and may be present in such illustrative ranges as less than 50 wt %, less than 40 wt %, less than 30 wt %, less than 20 wt %, less than 15 wt %, less than 10 wt %, less than 5 wt %, between 20-40 wt %, between 10-30 wt %, between 3-20 wt %, and between 5-12 wt % of the mixture. Any of the magnetic or non-magnetic fractions may also be used to form composites containing ceramics, polymers, glasses, etc.

The magnetic fractions produced according to methods of the present disclosure may be used in applications that exploit this magnetic property, such as use in projectiles for electromagnetic rail guns and in applications where it is desirable to be able to identify and/or reclaim the articles with a magnet. For example, when used in firearms projectiles, this magnetic property may be useful to distinguish lead substitutes from lead projectiles. As another example, when used in target ranges or other areas where numerous cartridges will be fired, magnetic projectiles may be desired so that the spent projectiles may be recovered with magnets, regardless of whether the projectiles remain intact or partially or completely return to powder upon impact.

At least partially on account of its lower tungsten content, the magnetic fraction should have a lower melting point than the non-magnetic fraction. Therefore, it may be desirable to use any of the magnetic fractions produced according to methods of the present disclosure in applications where a molten feedstock is formed and thereafter used to form articles and/or in applications where a powder-form feedstock undergoes liquid-phase sintering. More particularly, these fractions may enable the articles to be formed without requiring the high temperatures (and associated equipment) that are otherwise required when bulk ferrotungsten or tungsten is used.

In applications where the ferrotungsten-containing powder is melted prior to being cast, dropped/sieved/quenched, or otherwise formed into articles, the flowability of the ferrotungsten-containing powder to be used is essentially not a factor. Therefore, fine particles 12 may be used as effectively as larger particles, with the larger particles potentially being saved for use in powder metallurgy or other applications where the flowability of the powder is more of a concern. Similarly, other than giving consideration to the desired density of the articles produced therefrom, any of the fractions produced by the methods of the present disclosure may be used in these molten feedstock applications. A benefit of utilizing such an application for at least a portion of the fractions is that fractions that are not desirable, are not used for a particular application, and/or for which there is insufficient demand can still be used as a component for molten feedstocks.

As another example, in some applications, such as producing tungsten-containing steel, the importance is on the amount of tungsten present in the resulting steel without much, if any, concern about the density of the steel. More particularly, since iron is used to produce steel, the ferrotungsten-containing powder simply provides at least some of the required iron, as well as the desired tungsten. Therefore, magnetic fractions may be used for such an application, with the heavier non-magnetic fractions being reserved for applications, such as for forming substitutes for tungsten, Densaloy™, Heavy Metal™, and/or lead, where the density of the resulting articles is of more importance. As a related example, forming tungsten-containing steel provides another example of an application where the particle size of the ferrotungsten-containing powder is not important, as the powder will be melted during the formation process. Therefore, any of the produced fractions may be used in such an application.

Although the preceding discussion emphasizes the use of ultrasonic screening to remove fine particles from a quantity of ferrotungsten-containing powder, it is within the scope of the present disclosure that other methods may additionally or alternatively be used to remove the fine particles and/or that the method does not include a fine particle removal step. Illustrative examples of other processes to remove fine particles include air separation, and various washing processes. Air separation refers to blowing or otherwise spraying the powder with compressed air to forcibly overcome the surface static forces and remove the fine particles. This process is especially well-suited for removal of ultra-fine particles, such as −400 mesh particles. It is within the scope of the present disclosure that other suitable gases or mixtures of gases may be used. As the name implies, washing refers to immersing, spraying or otherwise contacting the ferrotungsten-containing powder with a suitable liquid. However, washing requires careful consideration of a suitable wash agent, as some wash agents are effective at removing fine particles but also otherwise affect the powder and/or raise other concerns. For example, water, or a water-based wash agent, may effectively remove fine particles, but may also cause the powder to rust. Rust-inhibiting wash agents, such as wash agents that include sodium nitrite may effectively remove the fine particles but also tend to coat the particles with a salt residue. An organic wash agent, such as propylene glycol and alcohol raise environmental concerns about the containment and disposal of the wash agent, with alcohol and other flammable organic wash agents also raising safety concerns due to their flammability. Therefore, washing processes are within the scope of the present disclosure, but the wash agent to be used should be selected so that it does not impair the intended use or application of the washed powder.

Although the preceding discussion emphasizes the use of magnetic separation processes to divide a quantity of ferrotungsten-containing powder into heavier and lighter fractions, it is within the scope of the present disclosure that other phase-separation processes may be used, either instead of or in addition to the magnetic separation processes described herein. Illustrative examples of other phase-separation techniques include gravity concentration, electrostatic separation, chemical flotation, color separation, separation based on particle morphology, and separation based on resistances to comminution. Gravity separation processes utilize the density differences of the particles in the ferrotungsten powder to achieve separation of the powder into denser and lighter fractions. Illustrative examples of gravity separation processes include fluid classification, tabling, jigging, flowing film separation, and the like. Electrostatic separation separates the powder into fractions based on the differences in the electrical conductivity of the phases present in ferrotungsten-containing powder. Chemical flotation separates the ferrotungsten-containing powder by utilizing the differences in the surface chemistry of the particles. As the names imply, color separation refers to classification based on the color of the particles and morphology separation refers to separation based on the shape of the particles. In experiments, the non-magnetic particles tended to be lighter in color and rounder in shape than the magnetic particles. Separation based on resistance to comminution utilizes the different resistances of the phases to crushing and grinding to identify and separate particular phases of the ferrotungsten-containing powder.

As introduced previously in connection with FIG. 18, it is also within the scope of the present disclosure that the source of ferrotungsten powder and/or the ferrotungsten powder and/or a fraction produced by any of the above-described separation processes may be treated to increase the density of the powder. Examples of density-enhancing treatments include chemical leaching, heat treatment and vacuum treatment. Chemical leaching refers to using a solvent, such as hydrochloric acid, to chemically leach iron out of the ferrotungsten (or fraction thereof). Heat treatment refers to heating the ferrotungsten (or fraction thereof) to shift the composition and/or distribution of phases present thereto, such as to higher-density phases. Vacuum treatment refers to heating the ferrotungsten (or fraction thereof) in a vacuum to remove iron, which has a much lower vapor pressure than tungsten, thereby increasing the density of the resultant ferrotungsten (or fraction thereof).

Figure 20:
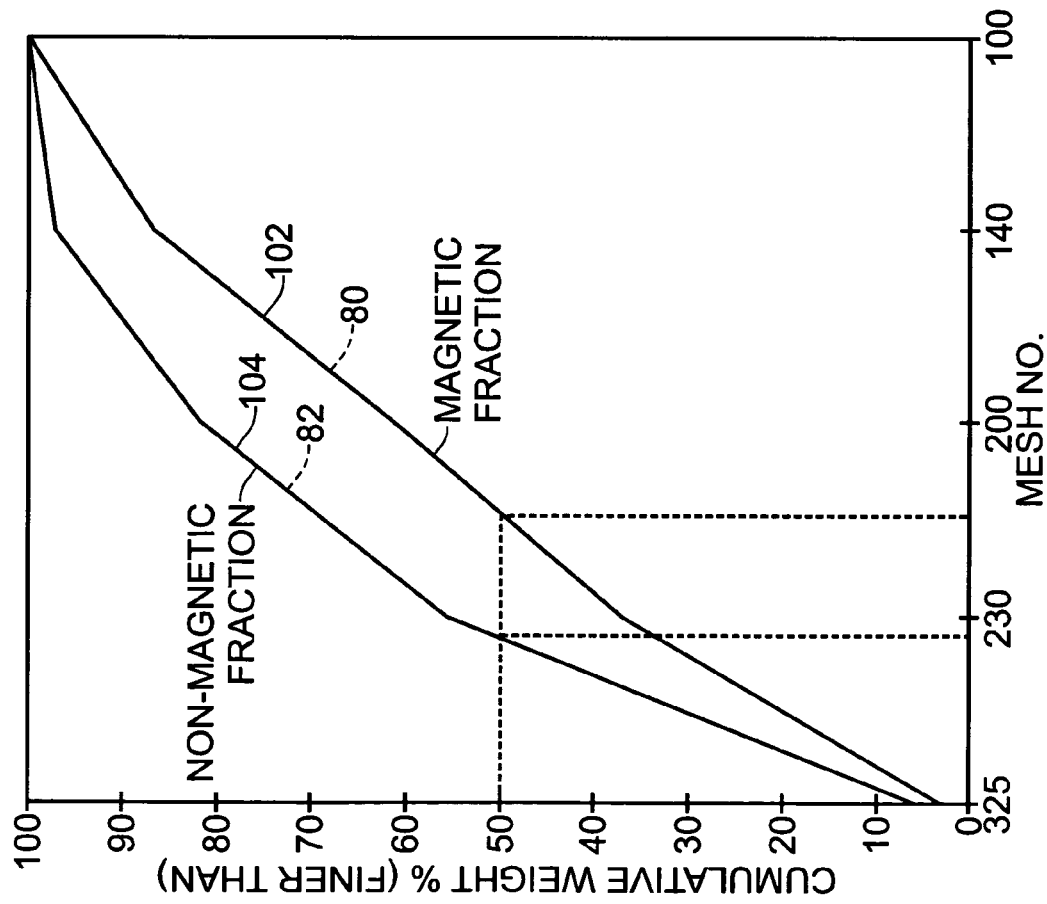
FIG. 20 is a graph illustrating empirically determined particle size distributions for magnetic and non-magnetic fractions of a batch-milled sample of ferrotungsten-containing powder processed according to a method of the present disclosure.

The following description is intended to provide illustrative examples of the distribution and properties of fractions of ferrotungsten-containing powder obtained during experiments with methods according to the present disclosure. For example, in FIG. 20, a graph depicts the empirically determined particle size distributions of magnetic and non-magnetic fractions obtained from a sample of −100/+325 mesh ferrotungsten-containing powder that originated from a source of ferrotungsten that was ground using a batch milling process. Magnetic and non-magnetic samples of this −100/+325 mesh powder were classified using sieves to explore the particle size distribution within the magnetic and non-magnetic fractions. The results of this sieve analysis are reproduced in the following table, with the $D_{50}$'s for the fractions indicated in dashed lines. It should be understood that FIG. 20 and the following table present the empirical data from a batch-milled sample of ferrotungsten and that the particle size distribution will tend to vary depending, for example, upon the type and duration of milling process used to form the bulk ferrotungsten-containing powder, the particular composition of the source of ferrotungsten, the magnetic source and magnetic separation process utilized, and/or the formation and subsequent processing of the source ferrotungsten.

Sieve Analysis of Batch Ground −100/+325 Mesh
Ferrotungsten-Containing Powder

| Mesh Size | Non-Magnetic Fraction | Magnetic Fraction |
|---|---|---|
| +100 | 0.06 | 1.03 |
| 100/140 | 2.80 | 12.49 |
| 140/200 | 15.47 | 25.07 |
| 200/230 | 25.76 | 24.13 |
| 230/325 | 50.09 | 34.09 |
| −325 | 5.82 | 3.19 |

For purposes of evaluating potential applications for the fractions produced according to methods of the present disclosure, the empirically determined properties of various samples of tungsten, tungsten-containing powders, and processed ferrotungsten-containing powders are produced below. While not required to all fractions or ferrotungsten-containing powders produced according to the present disclosure, the data described herein may be selectively used to characterize powder and/or fractions according to the present disclosure, such as on a quantitative or qualitative (relative) basis.

Illustrative Properties of Tungsten-Containing Powders

| Material | Hall Flow (sec/50 g) | Apparent (Scott) Density (g/cc) | Tap Density (g/cc) | Mix[1] Hall Flow (sec/50 g) | Mix[1] Pellet Density[4] |
|---|---|---|---|---|---|
| pure W (6 micron, dry[2]) | no flow | 4.78 | 6.79 | | |
| pure W (26 micron, dry[2]) | no flow (18 sec with constant tapping) | 5.60 | 7.97 | 12 | 13.24 |
| WHA[3] (−40 mesh) | 12 | 6.93 | 8.12 | 14 | 12.03 |
| non-mag FeW fraction (−100/+325) | 7 | 9.315 | 10.81 | 10 | 12.50 |
| mag FeW fraction (−100/+325) | no flow | 5.10 | 6.12 | 19 | 9.18 |

[1]"mix" refers to a mixture of 78 wt % of the material in column 1 of the table, 21.25 wt % Acu-150 ™ tin, 0.5 wt % of a flexible epoxy (such as a flexible rebar epoxy available from DuPont), and 0.25 wt % Kenolube ™ (lubricant).
[2]tungsten powder adsorbs water from the air surrounding the powder, and therefore the powder is preferably heated or otherwise dried prior to use.
[3]WHA refers to tungsten heavy alloys, which typically have densities in the range of approximately 15 g/cc to approximately 18 g/cc, and often have a density of 17 g/cc or approximately 17 g/cc. As used herein, WHA refers to an alloy including tungsten, nickel and iron, such as an alloy comprising 90-93 wt % tungsten, 5-7 wt % or more nickel, 2-3 wt % iron and possibly minor amounts of other components, such as copper, carbon, molybdenum, silicon, etc. As discussed in more detail herein, other heavy alloys of tungsten contain other compositions and/or distributions of component elements.
[4]80 ksi compaction of 7 grams of powder in a 0.342 inch diameter mold.

It is worth noting that the −100/+325 non-magnetic fraction has a Scott density and a tap density that are significantly higher than either of the two types of pure tungsten powder that were evaluated. In a further experiment to evaluate the unexpectedly high density of the −100/+325 non-magnetic fraction, the Scott cup (1.5 cubic inch brass cup) was placed on a vibratory device. As the cup (and the non-magnetic fraction sample contained therein) was vibrated, the density increased to 10.95 g/cc. As the powder in the cup continued to settle, additional amounts of the powder were added until a density of 11.22 g/cc was obtained. This is essentially the density of a conventional lead-antimony bullet, with this density being obtained without compressing the powder.

An illustrative application of this experiment is to produce jacketed (lead-substitute or other) bullets by filling a jacket with the non-magnetic fraction from the magnetic separation process, optionally vibrating the jacketed powder, and then sealing the jacket. In other words, these bullets may be formed from the powder without melting or compacting the ferrotungsten-containing powder, and yet may still achieve densities of at least 9 g/cc, including densities of at least 10 g/cc, at least 11 g/cc, at least 11.2 g/cc, in the range of 10.95—at least 11.2 g/cc, etc. This method is graphically illustrated in FIG. 21 at 250. As indicated at 252, a quantity of ferrotungsten-containing powder that is at least substantially formed from non-magnetic fraction 104 is inserted into a jacket. At 254, the jacket and powder are optionally subjected to a vibratory, or settling, process, and at 256, the jacket is sealed to form a jacketed bullet 258. Any suitable sealing process may be used. Illustrative examples include sealing the opening in the jacket with a curable liquid resin, soft metal, a mechanical lid, etc. As indicated in dashed lines at 260, the jacketed bullet may optionally be worked after the sealing step. Illustrative examples of various working processes include shaping of the jacket and/or sintering or other heat treatment of the jacketed bullet. At 262, the jacketed bullet is assembled into a firearm cartridge 264, which typically contains a casing that includes a cup, primer, and a charge. Illustrative examples of suitable sealing and working processes, as well as suitable binders, secondary metal components, and the like, are disclosed in U.S. patent application Ser. No. 10/698,827, the complete disclosure of which is hereby incorporated by reference for all purposes. The illustrative method may further include the addition of one or more lubricants, binders and/or filler materials to the powder. It is within the scope of the present disclosure that the above-discussed powder-metallurgy process for forming a bullet may be performed with any of the other fractions (and mixtures thereof and/or blends containing one or more of these fractions) disclosed herein. Illustrative, non-exclusive examples, include the utilization of non-magnetic ferrotungsten-containing powder that is mixed with other ferrotungsten-containing powder, fillers, lubricants, etc.; and non-magnetic ferrotungsten-containing powder that forms at least a significant portion or even all or nearly all of the tungsten-containing powder to be used and/or of all of the powder that is used (i.e., inclusive of binders, fillers, lubricants, etc.).

Figure 21:
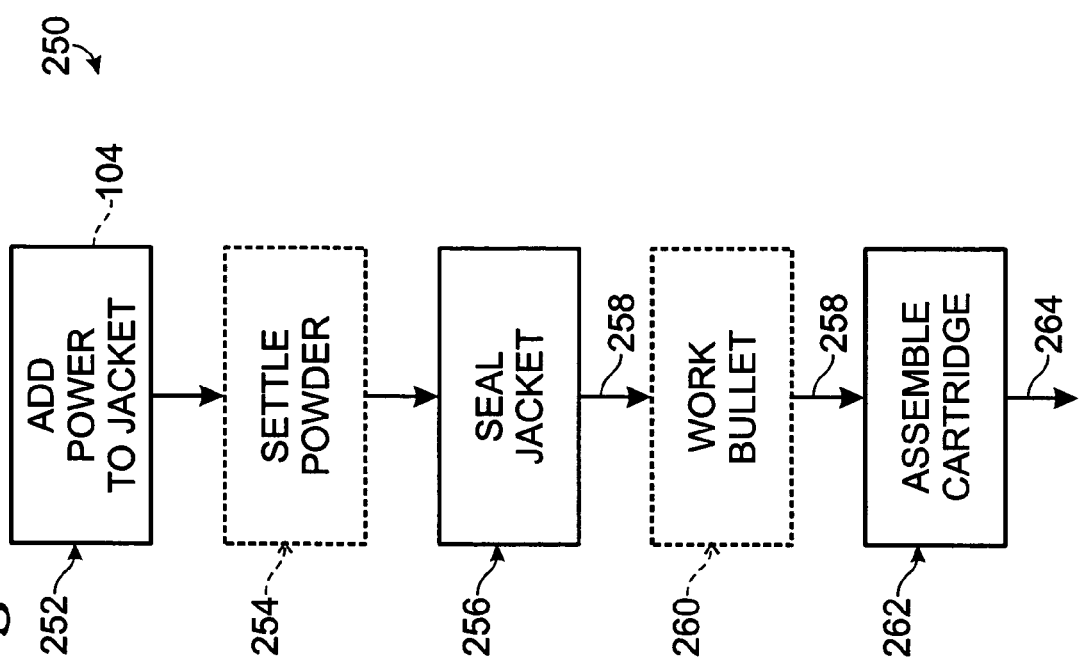
FIG. 21 is a flow chart illustrating an illustrative method for forming jacketed bullets or other articles that include uncompressed ferrotungsten-containing powder according to the present disclosure.

It is within the scope of the present disclosure that other articles may be formed according to lead-density, near lead density ($^+/-0.2$ g/cc), greater than lead density, etc. using uncompacted ferrotungsten-containing powder according to the method of FIG. 21, with this variant of the method substituting a housing or other body for the bullet jacket described above. Examples of these objects include any object that has previously been formed from lead, or a lead alloy, and for which the object may include an outer housing (or jacket). Illustrative example of these articles, including radiation shields, various weights and stabilizers, and the like, are discussed in more detail below.

Although the above experiments and methods indicate that processed ferrotungsten-containing powders (and mixtures thereof) according to the present disclosure may be suitable for use as lead substitutes without requiring compaction of the powders in the article, it is also within the scope of the disclosure that any suitable compaction or other densification process may be used. For example, the (vibratory-settled, or not) powders may be compacted under pressure with a suitable die or press. In experiments, the above-described vibration-settled sample increased in density to 12.84 g/cc when compressed to 100 ksi (i.e., when a compression pressure of 100 ksi was applied to the powder). Other examples of densification processes that may be used (in addition to or in place of the vibration and/or compression) include ultrasonic vibration and/or air evacuation (vacuum).

As discussed, processed ferrotungsten-containing powders according to methods of the present disclosure may also be mixed with other components prior to forming articles therefrom. For example, one or more metal or non-metal filler materials may be added to a quantity of one of the fractions of processed ferrotungsten-containing powder (or a mixture of two or more fractions). In the context of at least powder metallurgy applications, one or more metal and/or non-metal binders and/or lubricants may additionally or alternatively be added to the processed fraction(s).

Figure 22:
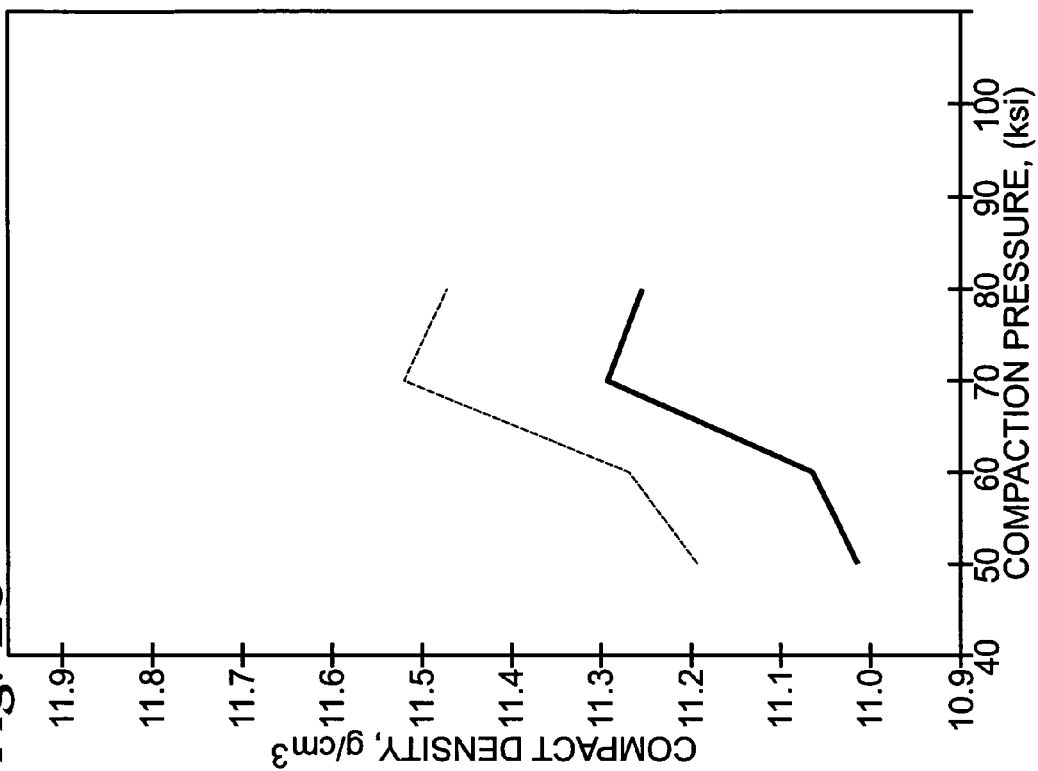
FIG. 22 is a graph illustrating the density of compacted articles formed from a composite powder mixture that includes ferrotungsten-containing powder obtained according to a method of the present disclosure.
Figure 23:
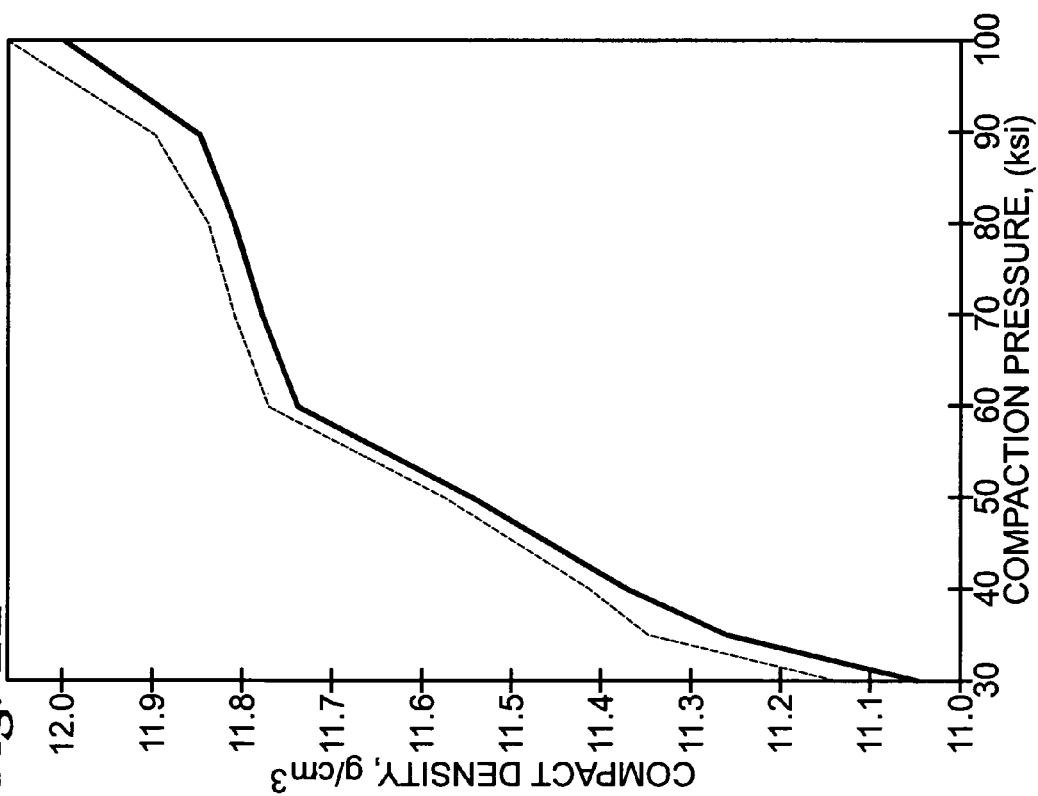
FIG. 23 is a graph illustrating the density of compacted articles formed from another composite powder mixture that includes ferrotungsten-containing powder obtained according to a method of the present disclosure.
Figure 24:
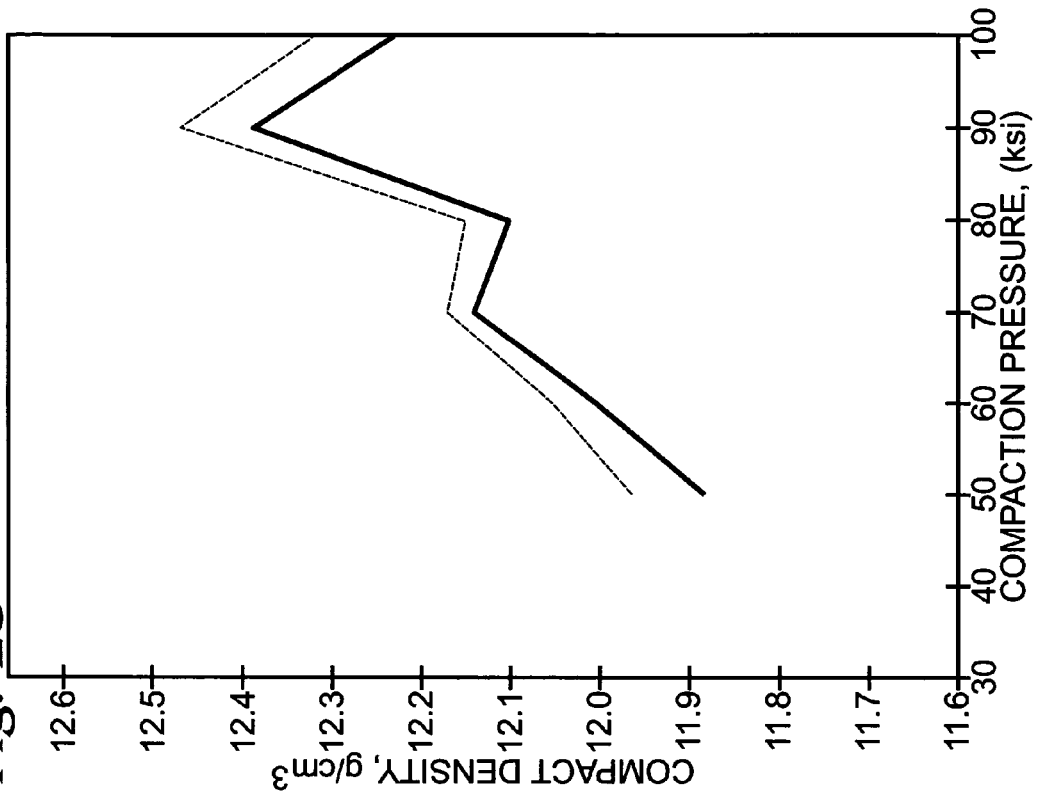
FIG. 24 is a graph illustrating the density of compacted articles formed from another composite powder mixture that includes ferrotungsten-containing powder obtained according to a method of the present disclosure.
Figure 25:
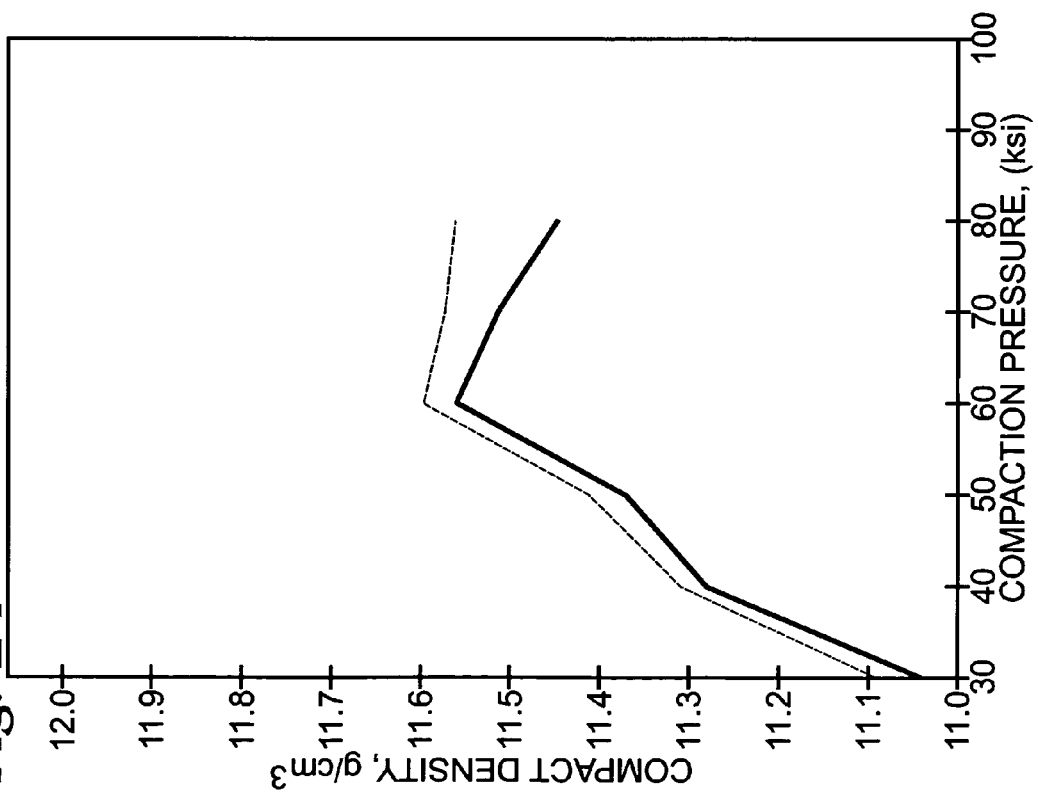
FIG. 25 is a graph illustrating the density of compacted articles formed from another composite powder mixture that includes ferrotungsten-containing powder obtained according to a method of the present disclosure.

The above-incorporated patent applications disclose various illustrative compositions in which one or more fractions of the processed ferrotungsten-containing powder according to the present disclosure may be used. For the purpose of evaluating illustrative quantitative and qualitative properties of a mixture of powders that include processed ferrotungsten-containing powder according to the present disclosure, a powder mixture containing 78 wt % −100/+325 non-magnetic ferrotungsten-containing powder produced according to the illustrative method depicted in FIG. 19 was mixed with 21.25 wt % Acu-150™ tin powder, 0.25 wt % Kenulube™ lubricant, and 0.5 wt % flexible rebar epoxy. The base mixture had a theoretical density of 12.933 g/cc and a compression ratio at 80 ksi of 1.7. FIG. 22 respectively depicts in solid and dashed lines the empirically determined densities of uncured and cured compacts formed from 7 grams of the base mix material compacted to various compaction pressures (measured in ksi (psi×1000)). FIGS. 23-25 demonstrate the uncured and cured densities of compacts formed from powders containing the base mix material with the respective addition of 0.5 wt % epoxy, 5 wt % Acu-150™ tin powder, and 10 wt % of 26 micron (dried) tungsten powder. Various ones of these illustrative samples were also tested for reflow properties and strength, with the results indicated in the following table.

Illustrative Properties of Compacts Formed via Powder Metallurgy From Powder Mixtures Containing Magnetically-Separated Ferrotungsten-Containing Powder

| | Base Mix | Base Mix + 0.54 wt % Epoxy | Base Mix + 5 wt % Acu-150 ™ Tin powder | Base Mix + 10 wt % W powder (26 μ, dried) |
|---|---|---|---|---|
| Hall Flow (sec/50 g) | 10.5-11 | 10 | 11 | 9.5 |
| Reflow Pressure (ksi)[5] | | | | |
| after 30 ksi compaction | 28.4 | | | |
| after 35 ksi compaction | 28.4 | | | |
| after 40 ksi compaction | 28.4 | | | |
| after 50 ksi compaction | 28.4 | | | |
| after 60 ksi compaction | 28.4 | 30.5 | 33.63 | 30.48 |
| after 70 ksi compaction | 29.4 | | | |
| after 80 ksi compaction | 29.4 | | | |
| after 90 ksi compaction | 29.4 | | | |
| after 100 ksi compaction | 28.4 | | | |
| Shear Strength (lb)[6] | | | | |
| after 30 ksi compaction and reflow testing | 42 | 85 | | |
| after 35 ksi compaction and reflow testing | 46 | | | |
| after 40 ksi compaction and reflow testing | 41 | 96 | | |
| after 50 ksi compaction and reflow testing | 45 | 50 | >110 | 97 |
| after 60 ksi compaction and reflow testing | 52 | 72 | >110 | 79 |
| after 70 ksi compaction and | 50 | 107 | 106 | 108 |

-continued

Illustrative Properties of Compacts Formed via Powder Metallurgy From Powder Mixtures Containing Magnetically-Separated Ferrotungsten-Containing Powder

| | Base Mix | Base Mix + 0.54 wt % Epoxy | Base Mix + 5 wt % Acu-150 ™ Tin powder | Base Mix + 10 wt % W powder (26 μ, dried) |
|---|---|---|---|---|
| reflow testing after 80 ksi compaction and | 72 | 108 | 106 | >110 |
| reflow testing after 90 ksi compaction and | 61 | | | 106 |
| reflow testing after 100 ksi compaction and reflow testing | 53 | | | 107 |

[5]reflow pressure was measured by compacting 7 grams of the mixture in a 9 mm bullet die having a 0.342 inch full internal diameter and a 0.156 inch diameter nose punch. The pellet was compacted at the indicated pressure to conform to the dimensions of the die, then the nose punch was removed and pressure was applied until the pellet extruded approximately 1/16" through the nose cavity.
[6]shear strength was measured by applying the 9 mm compact formed during the reflow test and applying a chisel-shaped tool transversely to a central full-diameter region of the compact and thereafter applying pressure until shear was observed As demonstrated in FIGS. 23-25, adding additional tin powder to the master mix material tended to increase the reformability of the compacted pellet, but decrease the density of the pellet. The addition of more epoxy to the master mix material tended to increase the strength of the pellet, but decrease the density of the pellet. The addition of pure tungsten powder to the master mix material tended to increase the density of the pellet and thereby reduce the compaction pressure required to achieve a desired density. While not required, tungsten-containing powders produced according to the present disclosure that will be used for powder-metallurgy applications preferably will have a Hall flowmeter reading (50 grams) of less than 16 seconds, and preferably less than 12 seconds, and more preferably of less than 10 seconds.

In an additional experiment, a mixture of 90 wt % of the −100/+325 non-magnetic fraction of ferrotungsten powder was mixed with 9 wt % of a binder, and 1 wt % of wax. Illustrative metal binders include at least one of nickel, iron, copper, cobalt, aluminum and manganese. The composite powder was compacted at 80 ksi and thereafter heated to approximately 450-500° F. for approximately 1.5-2 hours to dewax the resulting pellet. In experiments, the pellets increased in strength by factors of 2-4 after the dewaxing process. More particularly, the dewaxed pellets demonstrated shear strengths of at least 50 pounds.

Figure 26:
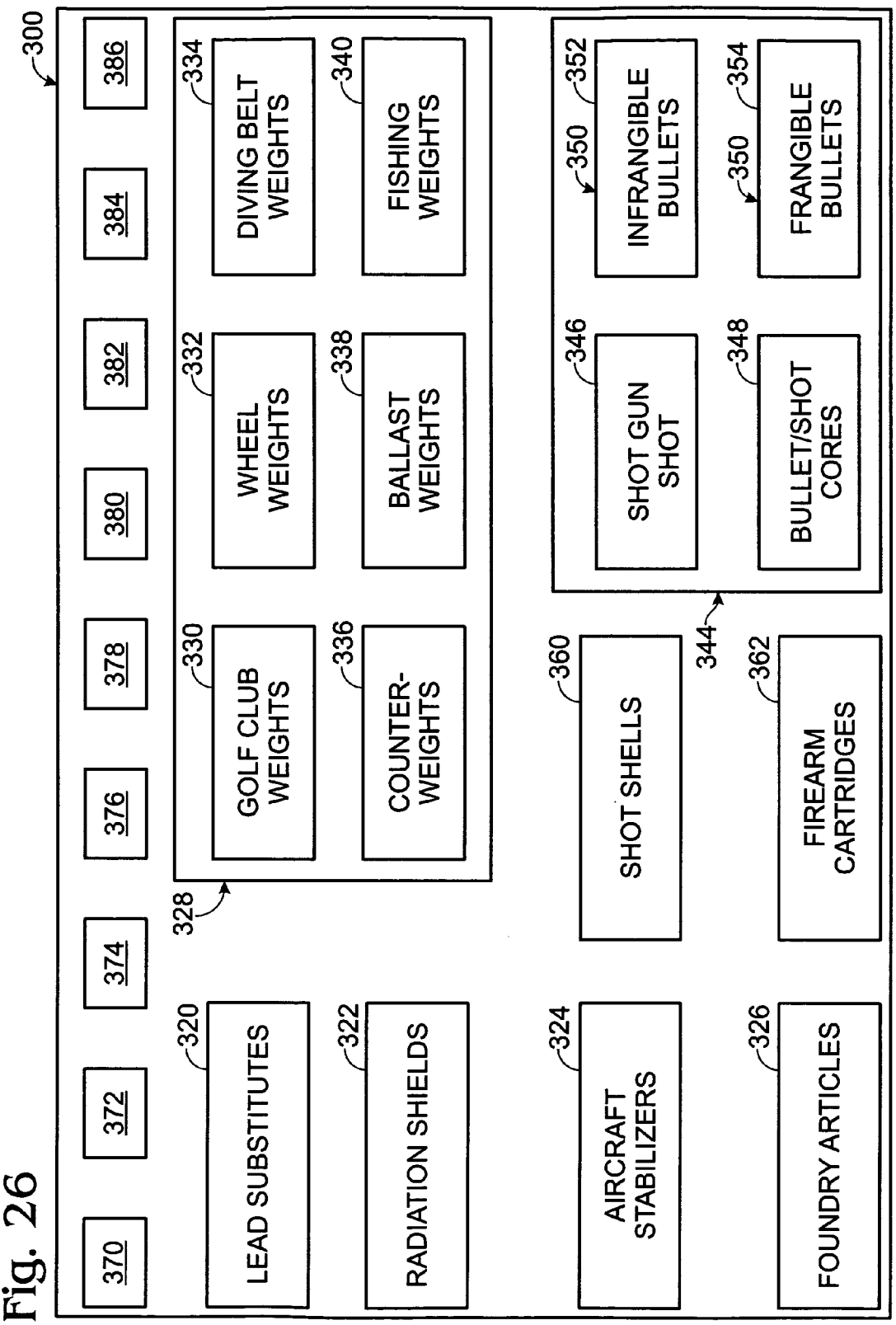
FIG. 26 is a schematic diagram illustrating examples of articles that may be formed using ferrotungsten-containing powders processed according to the present disclosure.

Illustrative (and non-exclusive) additional examples of articles that may be formed from one or more fractions produced according to methods of the present disclosure, and to mixtures thereof, are schematically illustrated in FIG. 26 and generally indicated at 300. These methods include, but should not be limited to, powder-metallurgy methods, methods that utilize a molten feedstock, metal injection molding, etc. Powder metallurgy methods may (but are not required to) include cold compaction, no compaction, sintering (liquid and solid phase), binder actuation, dewaxing, etc. Molten feedstock applications include (but are not limited to) fully molten feedstocks, partially molten feedstocks, casting, drop casting, molding, etc. As shown, these articles include lead substitutes 320 (i.e., a generic representation of articles that previously have been formed completely or at least substantially from lead or a lead alloy), radiation shields 322, aircraft stabilizers 324, foundry articles 326, and weights 328, including golf weights 330, wheel weights 332, diving belt weights 334, counter-weights 336, ballast weights 338, and fishing weights 340. Additional examples of articles 300 include firearm projectiles 344, including shotgun shot 346, bullet/shot cores 348, and bullets 350, such as infrangible bullets 352, and frangible bullets 354. These firearm projectiles may be incorporated into finished articles, such as shot shells 360, firearm cartridges 362, as well as other structures used to house one or more firearm projectiles. Still further illustrative examples include heat sinks 370, armor 372, electronic materials and devices 374, electromagnetic materials and devices 376, precursors for tungsten carbide 378, and precursors for tungsten-based chemicals 380, precursors for tungsten-based compounds 382, tungsten substitutes 384 (i.e. substitutes for pure tungsten), and tungsten-alloy substitutes 386.

The non-magnetic fraction produced according to methods of the present disclosure, both with and without a fine particle removal process, may be used as a comparatively inexpensive new raw material that in some applications may be used as a substitute for pure tungsten powder. More specifically, this fraction has a density in the range of 17-18 g/cc, which is nearly the density of pure tungsten (19.3 g/cc). Accordingly, the non-magnetic fraction may be described as being a substitute for pure tungsten. It may be even better suited as a substitute for Densaloy™ and Heavy Metal™.

It is within the scope of the present disclosure that the separation processes described and/or illustrated herein may be applied to other magnetic tungsten-containing alloys, such as tungsten alloys that include at least one of iron, nickel and cobalt. It is also within the scope of the present disclosure that any of the above-described fractions and/or methods in which at least a substantial portion (i.e., ≧80%) of a component is removed may be implemented such that at least a significant portion (i.e., >90%) of the component, or even all or nearly all (i.e., ≧98%) of the component is removed.

Figure 27:
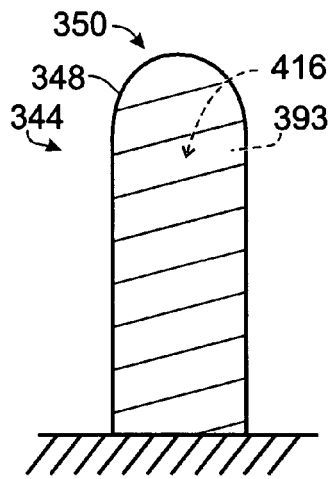
FIG. 27 is a cross-sectional view of a firearm core or bullet containing ferrotungsten-containing powder according to the present disclosure.
Figure 28:
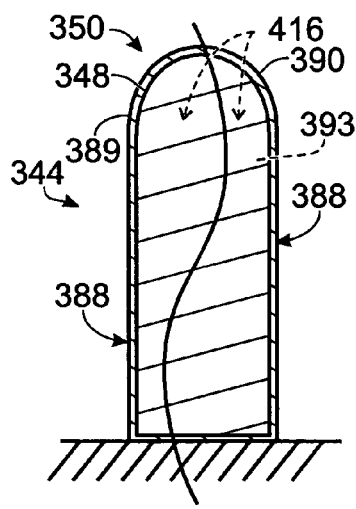
FIG. 28 is a cross-sectional view of another bullet containing ferrotungsten-containing powder according to the present disclosure.
Figure 29:
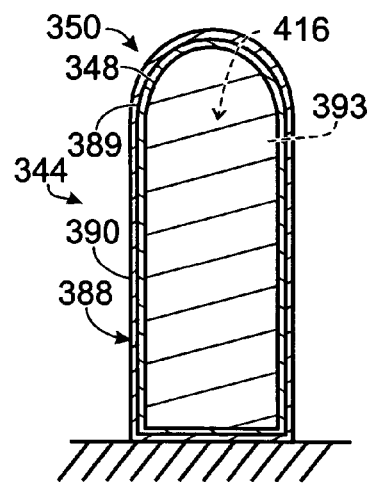
FIG. 29 is a cross-sectional view of another bullet containing ferrotungsten-containing powder according to the present disclosure.

FIGS. 27-29 graphically, and somewhat schematically, depict examples of illustrative firearm bullets that may include cores 348 containing ferrotungsten-containing powder produced according to the present disclosure. Each of the illustrated bullets includes a core 348 that includes, and preferably is at least substantially formed from, ferrotungsten-containing powder according to the present disclosure. This powder is schematically depicted at 416 in FIGS. 27-29, and in the subsequently discussed FIGS. 30-32. For example, powder 416 may represent any of the ferrotungsten-containing powder produced according to the present disclosure, such as via any of the size and/or magnetic separation processes, including those depicted in FIGS. 16-18. Powder 416 may form any desired amount of cores 348, and bullets formed therefrom, including being a minority component (less than 50 wt %), at least 50 wt % of the core or bullet, at least a substantial portion (at least 80 wt %), at least a significant portion (at least 90 wt %), or all or nearly all (at least 98 wt %) thereof. Accordingly, in embodiments where the powder does not form all of the core, the core and/or bullet will include other materials as well.

Cores 348 may be formed by any suitable process, such as via powder metallurgy or from a molten feedstock. Similarly, although referred to as ferrotungsten-containing powder according to the present disclosure, the powder may not remain in powder form after formation of the finished article. For example, in some applications, a component of the ferrotungsten-containing powder is at least partially, or completely, melted and used to cast, quench or otherwise form articles. In the following discussion, the term "core" or bullet core" will be used to refer to the compacted or otherwise solid structure that contains ferrotungsten-containing powder 416 according to the present disclosure. The cores may include other components as well, without departing from the scope of the present disclosure. As introduced with respect to FIG. 27, however, in some embodiments, these cores may also be referred to as a bullet, such as when the cores are incorporated into a firearms cartridge without plating or jacketing the core.

Cores 348 and/or bullets 350 (and other articles 300) may be constructed to have densities that are less than, equal to, or greater than a similarly-sized core or bullet formed from lead (11.3 g/cc) or a lead-antimony alloy (typically 10.9-11.2 g/cc). Similarly, cores 348 and/or bullets 350 may be constructed to have a greater density than a similarly constructed lead or lead-antimony core or bullet. In some applications where the core or bullet is constructed to have a density that is greater than that of lead, such as a density that is greater than 11.5 g/cc, greater than 12 g/cc, in the range of 11.5-13 g/cc, etc., the core or bullet may have the same general dimensions as the conventional lead core or bullet, and thereby have a greater mass. In other applications, the core or bullet may have a shorter or otherwise differently-shaped core or projectile that has the same mass as a comparative lead or lead-antimony core or bullet. It is also within the scope of the disclosure to produce bullet cores and/or bullets that are formed from ferrotungsten-containing powder according to the present disclosure and which have a bulk density that corresponds to, or equals, the bulk density of a particular conventional lead or lead-antimony bullet.

The examples of bullets 350 shown in FIGS. 27-29 have been somewhat schematically illustrated. It is within the scope of the disclosure to shape the bullets to have any suitable bullet geometry, such as the shapes of conventional lead or lead-antimony bullets. The illustrated bullets 350 are provided as non-limiting examples, and it should be understood that other sizes and shapes may be used. Similarly, the thicknesses of the plating and/or jacket may vary, as described in more detail herein.

As discussed in more detail herein, the cores may be prepared by methods that include any of the compacting, heating, sealing, reshaping, activating, working, coating, plating and/or jacketing steps described and/or incorporated herein. In FIG. 27, the core forms the entire bullet, while in FIG. 28 the bullet includes an outer layer 388 that is formed from a different material than the core. As discussed, this outer layer may take the form of a coating or plating layer 389 or a jacket 390. In FIG. 29, the bullet includes both a coating/plating layer 389 and a jacket 390. Although it is within the scope of the present disclosure to produce cores, bullets and other articles by a method that does not include a sealing step, in some applications, a curable sealant may be applied to a compacted core before plating and/or jacketing. This optional sealing layer, which extends beneath the outer surface of the compacted core, is indicated schematically at 393 in FIGS. 27-29.

Jacket 390 is typically formed from metal and is swaged or otherwise applied in solid form around the core. Jacket 390 will typically have a greater thickness than plating layer 389 (when present). For example, a jacket 390 will typically have a thickness of at least approximately 0.01 inches. In practice, a 0.015 inch jacket has proven effective, but is by no means meant to be an exclusive example of suitable jacket thicknesses. Copper is an example of a suitable material for jacket 390 when bullet 350 is designed to travel at velocities of approximately 2000 feet per second or less, such as is common for most pistols and lower velocity rifles. However, bullets 260 for higher velocity rifles will often travel at 2500 feet per second or more and will typically utilize a more durable jacket. An example of a suitable high-velocity jacket material is gilding metal, which is an alloy of copper and approximately 5 wt % zinc. Jackets of other materials and/or thicknesses may also be used without departing from the scope of the disclosure.

Jacket 390 may completely enclose core 348 and closely conform to the shape and size of the core. It is also within the scope of the present disclosure that the jacket may define a region that is not filled with the core and/or its sealant/coating/plating. It is also within the scope of the present disclosure that the jacket may only extend around a portion of the core, thereby leaving a portion of the core accessible from external the jacket. This accessible portion may be recessed beneath an open end of the jacket, flush with the open end of the jacket, or project from the open end of the jacket. As another variation, the jacket may be twisted about the core, which may enhance the spinning effect of the bullet when fired.

Figure 30:
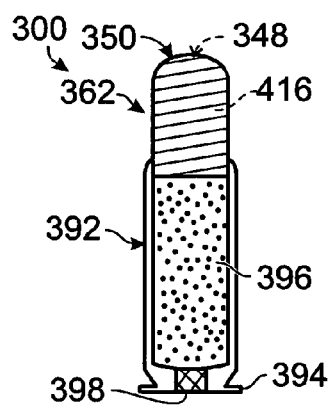
FIG. 30 is a cross-sectional view of a firearm cartridge that includes a core containing ferrotungsten-containing powder according to the present disclosure.

In FIG. 30, an article 300 in the form of a firearms cartridge 362 that includes a bullet 350 is shown. Bullet 350 schematically is intended to represent any bullet described, illustrated and/or incorporated herein that includes ferrotungsten-containing powder according to the present disclosure and which optionally may be produced via any of the methods disclosed, illustrated and/or incorporated herein. As such, bullet 350 may be frangible or infrangible, jacketed or not jacketed, etc. Cartridge 352 includes a case or casing 392. Casing 392 includes a cup 394, a charge 396 and a primer, or priming mixture, 398. Casing, primer and charge may be of any suitable materials, and may be collectively referred to as a firing mixture. Cartridge 362 is ready to be loaded into a firearm, such as a handgun, rifle or the like, and upon firing, discharges bullet 350 at high speeds and with a high rate of rotation. Although illustrated in FIG. 30 as a centerfire cartridge, in which primer 398 is located in the center of the base of casing 392, bullets according to the present disclosure may also be incorporated into other types of cartridges, such as a rimfire cartridge, in which the casing is rimmed or flanged and the primer is located inside the rim of the casing.

Figure 31:
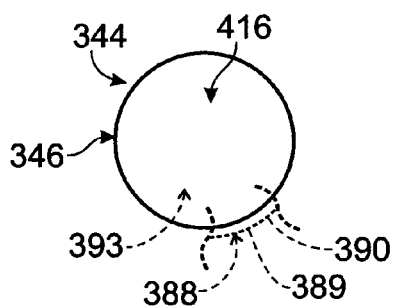
FIG. 31 is a side elevation view of a shot pellet containing ferrotungsten-containing powder according to the present disclosure.

Another firearm projectile 344 that may include ferrotungsten-containing powder 416, such as in any of the proportions discussed above with respect to cores 348, is shot 346, such as schematically illustrated in FIG. 31. Although illustrated as having a spherical configuration, it is within the scope of the disclosure that shot 346 may have non-spherical configurations as well. Shot 346 may also be referred to as a shot pellet. Similar to the above-discussed cores (and other articles 300), shot 346 may be at least partially formed from one or more materials other than powder 416. Shot 346 may (but is not required to) also include sealants 393 and/or exterior layer 388, such as coating 389 and/or jacket 390. Shot 346 may be formed from any suitable processes, including being cast or quenched from a molten feedstock and being formed via powder metallurgy.

Figure 32:
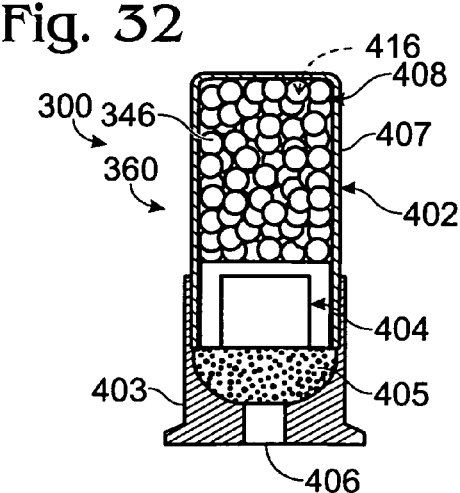
FIG. 32 is a schematic cross-sectional view of a firearm round in the form of a shotgun shell, or cartridge, that includes shot containing ferrotungsten-containing powder according to the present disclosure.

In FIG. 32, another type of ammunition, or firearm round, is shown and takes the form of an illustrative shot shell 360, which includes a case or casing 402. Casing 402 includes a base 403, which is typically formed from metal and houses the shell's wad 404, charge 405 and primer, or priming mixture, 406. The case also includes a hull, or shot region, 407, which is typically formed from plastic or another suitable non-metallic component and which defines a chamber 408 into which at least one shot 346 is housed. The top of the hull is typically crimped closed, although other constructions and sealing methods may be used. As discussed, most conventional shotgun shells are designed to house a plurality of shot, such as shown in FIG. 32. It is within the scope of the disclosure that shell 360 may include other constituent elements, as are conventional or otherwise known in the field of shotgun cartridge construction.

In FIG. 32, a plurality of shot 346 are included within shell 360, and the shot may be individually sized and shaped. Typically, each of the shot will have at least substantially the same size and shape as the other shot used in the same shell. However, it is also within the scope of the disclosure that shell 360 may include shot 346 having two or more distinct sizes, densities, materials of construction, formation methods, etc. The precise size of the shot pellets may be selected according to the desired use of the shot. For example, if designed for use as buckshot, each shot 346 will typically have a diameter D of approximately 0.24 to 0.36 inches. When designed for use as birdshot, each shot 346 will typically have a diameter of approximately 0.08-0.2 inches. For purposes of providing further examples, the following table provides examples of conventional shot sizes and the corresponding diameters.

Illustrative Shot Sizes and Diameter

| Buckshot | | Birdshot | |
| --- | --- | --- | --- |
| size | diameter (inches) | size | diameter (inches) |
| No. 4 | 0.24 | No. 9 | 0.08 |
| No. 3 | 0.25 | No. 8 | 0.09 |
| No. 1 | 0.30 | No. 7.5 | 0.095 |
| No. 0 | 0.32 | No. 7 | 0.1 |
| No. 00 | 0.33 | No. 6 | 0.11 |
| No. 000 | 0.36 | No. 5 | 0.12 |
| | | No. 4 | 0.13 |
| | | No. 3 | 0.14 |
| | | No. 2 | 0.15 |
| | | No. 1 | 0.16 |
| | | No. B | 0.17 |
| | | No. BB | 0.18 |
| | | No. BBB | 0.19 |
| | | No. T | 0.20 |

The number of individual shot in a particular shotgun shell 360 or other firearm round will tend to vary at least partially upon the diameter of the individual shot. For example, a double aught buckshot shell will typically include nine shot, while most birdshot shells will include dozens, if not hundreds, of shot. Although shot 346 having any of the above-identified diameters are within the scope of the present disclosure, the powder metallurgy processes described herein will most likely be used for larger shot, such as shot having a diameter of at least 0.1-0.13 inches. As discussed, shot 346 having dimensions other than illustrated herein also may be produced. Similarly, it is also within the scope of the present disclosure that a shot shell 360 may include some shot that is produced from or otherwise includes ferrotungsten-containing powder 416, while other shot within the shell may be formed from other materials and/or via other processes.

As a point of clarification, ferrotungsten-containing powder 416, as described herein, refers to a subset of the powder that is produced when a ferrotungsten-containing material is milled, ground or otherwise formed into powder.

Illustrative ways that ferrotungsten-containing powder produced according to the present disclosure may be described, or characterized, include (but are not limited to) one or more of the following:

density-enchanced powder formed from ferrotungsten-containing powder but having a greater density than ferrotungsten-containing powder;

powder formed from ferrotungsten-containing powder but having a higher concentration of magnetic particles than the ferrotungsten-containing powder from which it was formed;

powder formed from ferrotungsten-containing powder but having a higher concentration of non-magnetic particles than the ferrotungsten-containing powder from which it was formed;

powder formed from ferrotungsten-containing powder but having a lower concentration of fine particles than the ferrotungsten-containing powder from which it was formed, such as a lower concentration of 44 micron particles;

powder formed from ferrotungsten-containing powder but having a lower concentration of fine, magnetic particles than the ferrotungsten-containing powder from which it was formed;

powder formed from ferrotungsten-containing powder but having a higher concentration of $Fe_6W_7$ and BCC tungsten particles than the ferrotungsten-containing powder from which it was formed;

powder formed from ferrotungsten-containing powder but having a lower concentration of $Fe_6W_7$ and BCC tungsten particles than the ferrotungsten-containing powder from which it was formed;

powder formed from magnetic particles separated from ferrotungsten-containing powder;

powder formed from non-magnetic particles separated from ferrotungsten-containing powder;

powder formed by selectively removing fine particles, such as particles smaller than 44 micron, or another selected minimum particle threshold, from ferrotungsten-containing powder;

non-magnetic or other powder separated from ferrotungsten-containing powder and having a Hall flowmeter reading of less than 12 seconds, and preferably, less than 10 seconds, for 50 grams;

100/+325 non-magnetic powder separated from ferrotungsten-containing powder;

powder produced by ultrasonically screening ferrotungsten-containing powder to remove fine particles therefrom and optionally by thereafter magnetically separating the powder into at least magnetic and non-magentic fractions.

Separation methods, or processes, according to the present disclosure may be (but are not required to be) described as producing any of the above-described powder (s). Similarly, articles 300 that contain ferrotungsten-containing powder according to the present disclosure may be (but are not required to be) described as containing any of the above-described powder(s).

INDUSTRIAL APPLICABILITY

The present disclosure is applicable to the metallurgical, firearms, steel, automotive, electronics, aerospace, golf and other fields wherein articles have traditionally been formed from lead, and/or where articles are formed from or otherwise include tungsten alloys.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the disclosure or subsequently filed claims recite "a" or "a first" element or the equivalent thereof, it should be within the scope of the present inventions that such disclosure or claims may be understood to include incorporation of one or more such elements, neither requiring nor excluding two or more such elements.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. Firearm ammunition, comprising:
   a casing adapted to be received into a firearm;
   primer and propellant within the casing; and
   at least one projectile at least partially received into the casing, wherein the at least one projectile is at least substantially comprised of a non-magnetic fraction of ferrotungsten-containing powder.

2. The ammunition of claim 1, wherein the ferrotungsten-containing powder is at least substantially formed from ferrotungsten.

3. The ammunition of claim 1, wherein the ferrotungsten-containing powder consists essentially of ferrotungsten.

4. The ammunition of claim 1, wherein the projectile includes a jacket.

5. The ammunition of claim 4, wherein the jacket substantially encloses the non-magnetic fraction of ferrotungsten-containing powder and wherein the jacket is sealed without compressing the portion of the non-magnetic fraction to a pressure that exceeds 20 ksi.

6. The ammunition of claim 1, wherein the non-magnetic fraction is present in the projectile in non-compacted powder form.

7. The ammunition of claim 1, wherein the non-magnetic fraction is present in the projectile in compacted powder form.

8. The ammunition of claim 1, wherein at least a substantial portion of the powder has a particle size greater than 325 mesh and less than 100 mesh.

9. The ammunition of claim 1, wherein less than about 40% of the ferrotungsten-containing powder is −325 mesh by down particles.

10. The ammunition of claim 1, wherein the projectile has a density of at least 9 g/cc.

11. The ammunition of claim 1, wherein the projectile has a density of at least 10.5 g/cc.

12. The ammunition of claim 1, wherein the projectile has a density of at least 12 g/cc.

13. The ammunition of claim 1, wherein the projectile includes a greater concentration of $Fe_7W_6$ phase and BCC tungsten phase than bulk ferrotungsten-containing powder.

14. Firearm ammunition comprising a ferrotungsten-containing projectile, wherein the projectile at least substantially comprises a non-magnetic fraction of ferrotungsten powder.

15. Firearm ammunition comprising a ferrotungsten-containing projectile, wherein the projectile comprises:
   a jacket defining an internal compartment and having an opening;
   a density-enhanced ferrotungsten-containing powder in the internal compartment; and
   a core of density-enhanced ferrotungsten-containing powder having a density of at least 10.5 g/cc without being compressed beyond 20 ksi.

16. The ammunition of claim 15, wherein the core is at least substantially non-magnetic.

17. The ammunition of claim 15, wherein at least a substantial portion of the powder has a particle size greater than 325 mesh and less than 100 mesh.

18. Firearm ammunition comprising a ferrotungsten-containing projectile, wherein the projectile comprises a ferrotungsten-containing powder at least substantially comprising $Fe_7W_6$ phase and BCC tungsten phase particles.

19. Firearm ammunition comprising a ferrotungsten-containing projectile, wherein the projectile includes a density-enhanced ferrotungsten-containing powder formed substantially of ferrotungsten-containing powder having a density greater than 13 g/cc, and wherein less than about 40% of the ferrotungsten-containing powder is −325 mesh by down particles.

* * * * *